(12) United States Patent
Sakashita et al.

(10) Patent No.: US 7,467,275 B2
(45) Date of Patent: Dec. 16, 2008

(54) CAPACITY EXPANSION VOLUME MIGRATION METHOD

(75) Inventors: Yukinori Sakashita, Sagamihara (JP); Tsukasa Shibayama, Kawasaki (JP); Yuri Hiraiwa, Sagamihara (JP); Masahide Sato, Noda (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 11/446,272

(22) Filed: Jun. 5, 2006

(65) Prior Publication Data

US 2007/0239954 A1 Oct. 11, 2007

(30) Foreign Application Priority Data

Apr. 7, 2006 (JP) .............................. 2006-106098

(51) Int. Cl.
*G06F 12/02* (2006.01)
(52) U.S. Cl. ........................... 711/165; 711/2; 711/170; 711/173
(58) Field of Classification Search ................ 711/170, 711/173, 2, 165
See application file for complete search history.

(56) References Cited

U.S. PATENT DOCUMENTS 5,488,708 A * 1/1996 Hayashi ...................... 711/115
2003/0009619 A1 1/2003 Kano et al.
2003/0221063 A1* 11/2003 Eguchi et al. ............... 711/114

FOREIGN PATENT DOCUMENTS

JP 2003-015915 1/2003
JP 2003-345522 12/2003

* cited by examiner

*Primary Examiner*—Sanjiv Shah
*Assistant Examiner*—Jae U Yu
(74) *Attorney, Agent, or Firm*—Antonelli, Terry, Stout & Kraus, LLP.

(57) ABSTRACT

A common external storage device is connected to the first and second storage systems. The management computer comprises a capacity expansion volume migration section that migrates a capacity-expansion volume that the first storage system comprises to the second storage system; a host connection path switching section that switches the host connection path being used from a first host connection path that links a migration source capacity-expansion volume and the host computer to a second host connection path that links a migration destination capacity-expansion volume and the host computer; and an external connection path switching section that switches the external connection path being used from a first external connection path that links a storage area allocated to the migration source capacity-expansion volume and the external storage device to a second external connection path that links a storage area that is allocated to the migration destination capacity-expansion volume and the external storage device.

19 Claims, 20 Drawing Sheets

FIG. 2

| PHYSICAL RESOURCE NUMBER (T100) | EXTERNAL VOLUME INFORMATION (T110) |
|---|---|
| 1 | Storage3.1a2b.0 |
| ... | ... |

| LUN (T200) | SEGMENT NUMBER (T210) | START ADDRESS (T220) | END ADDRESS (T230) |
|---|---|---|---|
| 0 | 1 | 0 | 999 |
|  | 2 | 1000 | 1999 |
| 1 | 3 | 0 | 999 |
| ... | ... | ... | ... |

| POOL NUMBER (T300) | PHYSICAL RESOURCE NUMBER (T310) | SEGMENT NUMBER (T320) | START ADDRESS (T330) | END ADDRESS (T340) | USAGE STATE (T350) |
|---|---|---|---|---|---|
| 1 | 0 | 0 | 0 | 999 | UNALLOCATED |
|  |  | 1 | 1000 | 1999 | ALLOCATED |
|  |  | 2 | 2000 | 2999 | ALLOCATED |
|  |  | 3 | 3000 | 3999 | ALLOCATED |
|  | 1 | 4 | 0 | 999 | UNALLOCATED |
|  |  | 5 | 1000 | 1999 | ALLOCATED |
| ... | ... | ... | ... | ... | ... |

1215

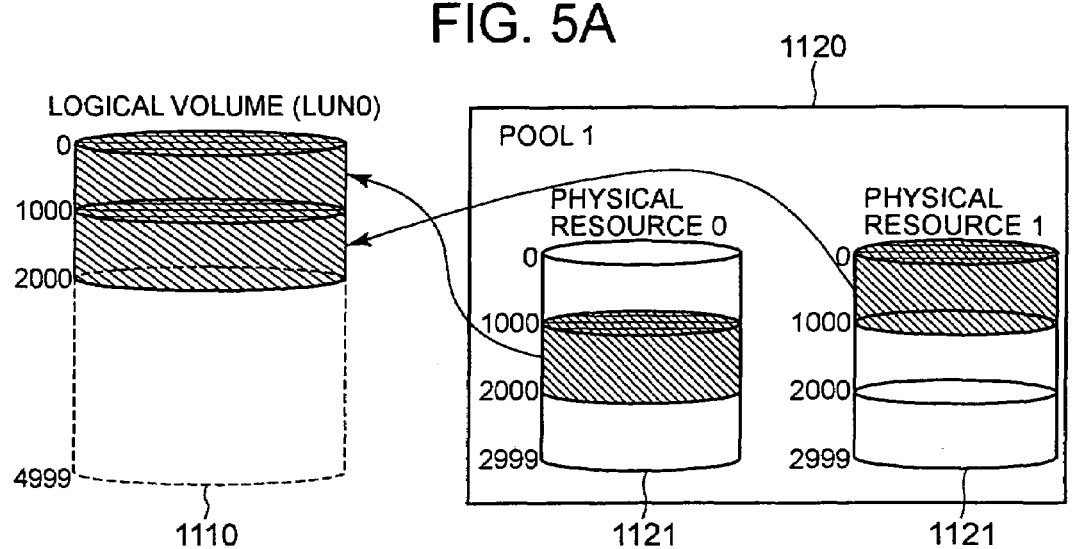

FIG. 6

| MODEL NAME | SERIAL NUMBER | FUNCTION INFORMATION |
|---|---|---|
| Storage1 | 1234 | CAPACITY-EXPANSION VOLUME FUNCTION |
|  |  | EXTERNAL CONNECTION FUNCTION |
|  |  | ... |
| Storage2 | abcd | CAPACITY-EXPANSION VOLUME FUNCTION |
|  |  | ... |
| ... | ... | ... |

| MIGRATION SOURCE MODEL NAME | MIGRATION SOURCE SERIAL NUMBER | MIGRATION SOURCE LUN | MIGRATION DESTINATION MODEL NAME | MIGRATION DESTINATION SERIAL NUMBER | MIGRATION DESTINATION LUN |
|---|---|---|---|---|---|
| Storage1 | 1234 | 1 | Storage2 | abcd | 10 |
| ... | ... | ... | ... | ... | ... |

| PATH IDENTIFICATION INFORMATION | CONNECTION DESTINATION STORAGE INFORMATION | ACCESS FLAG |
|---|---|---|
| 0 | Storage1.1234.1 | VALID |
|  | Storage2.abcd.10 | INVALID |
| ... | ... | ... |

T600 / T610 / T620 — 2120

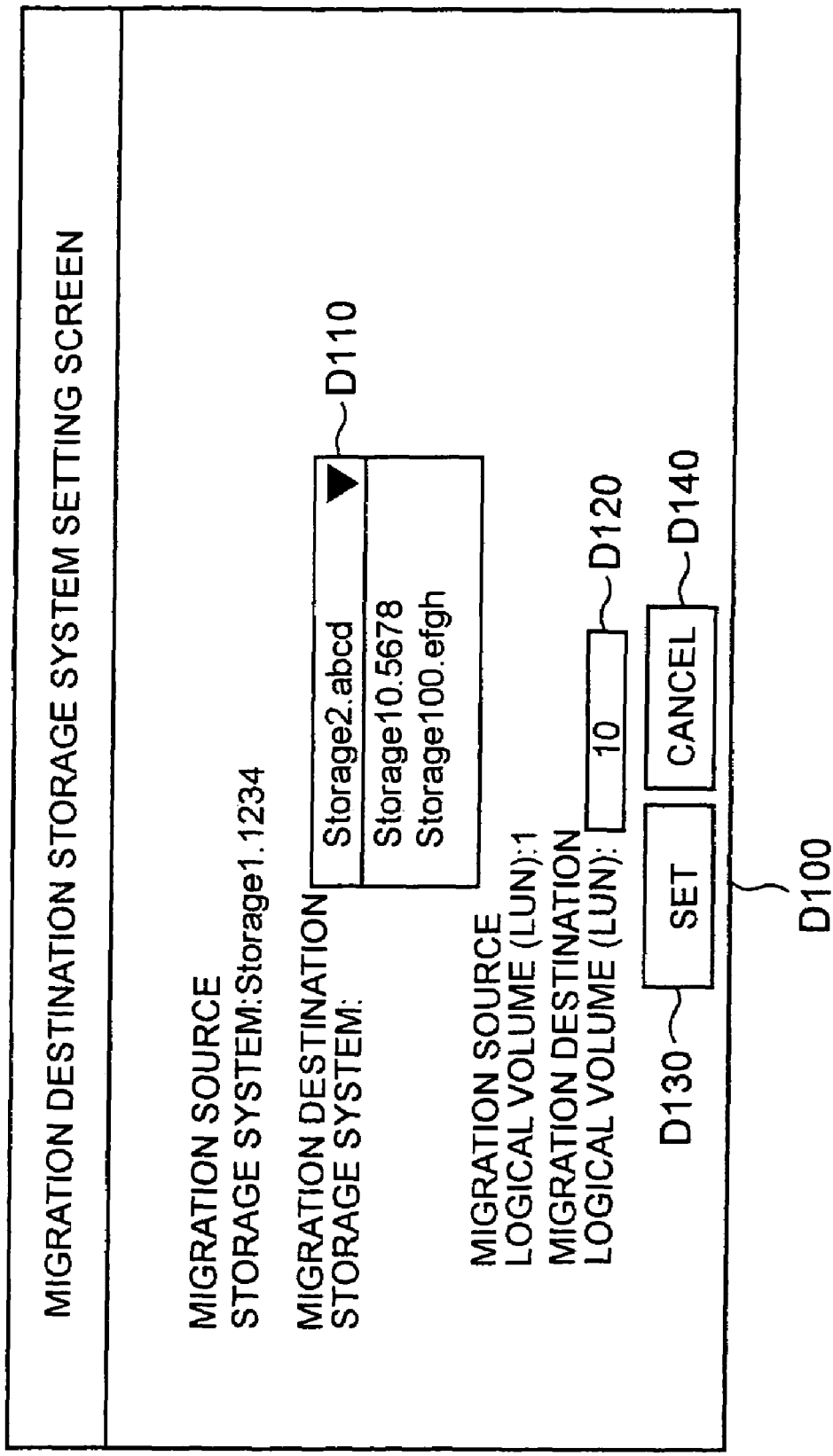

FIG. 19

| POOL NUMBER | PHYSICAL RESOURCE NUMBER | SEGMENT NUMBER | START ADDRESS | END ADDRESS | USAGE CONDITION | MANAGEMENT CONDITION |
|---|---|---|---|---|---|---|
| 1 | 0 | 0 | 0 | 999 | UNALLOCATED | BEING MANAGED |
| | | 1 | 1000 | 1999 | ALLOCATED | UNMANAGEABLE |
| | | 2 | 2000 | 2999 | ALLOCATED | UNMANAGEABLE |
| | | 3 | 3000 | 3999 | ALLOCATED | UNMANAGEABLE |
| | 1 | 4 | 0 | 999 | UNALLOCATED | BEING MANAGED |
| | | 5 | 1000 | 1999 | ALLOCATED | BEING MANAGED |
| ... | ... | ... | ... | ... | ... | ... |

T300, T310, T320, T330, T340, T350, T360

1215

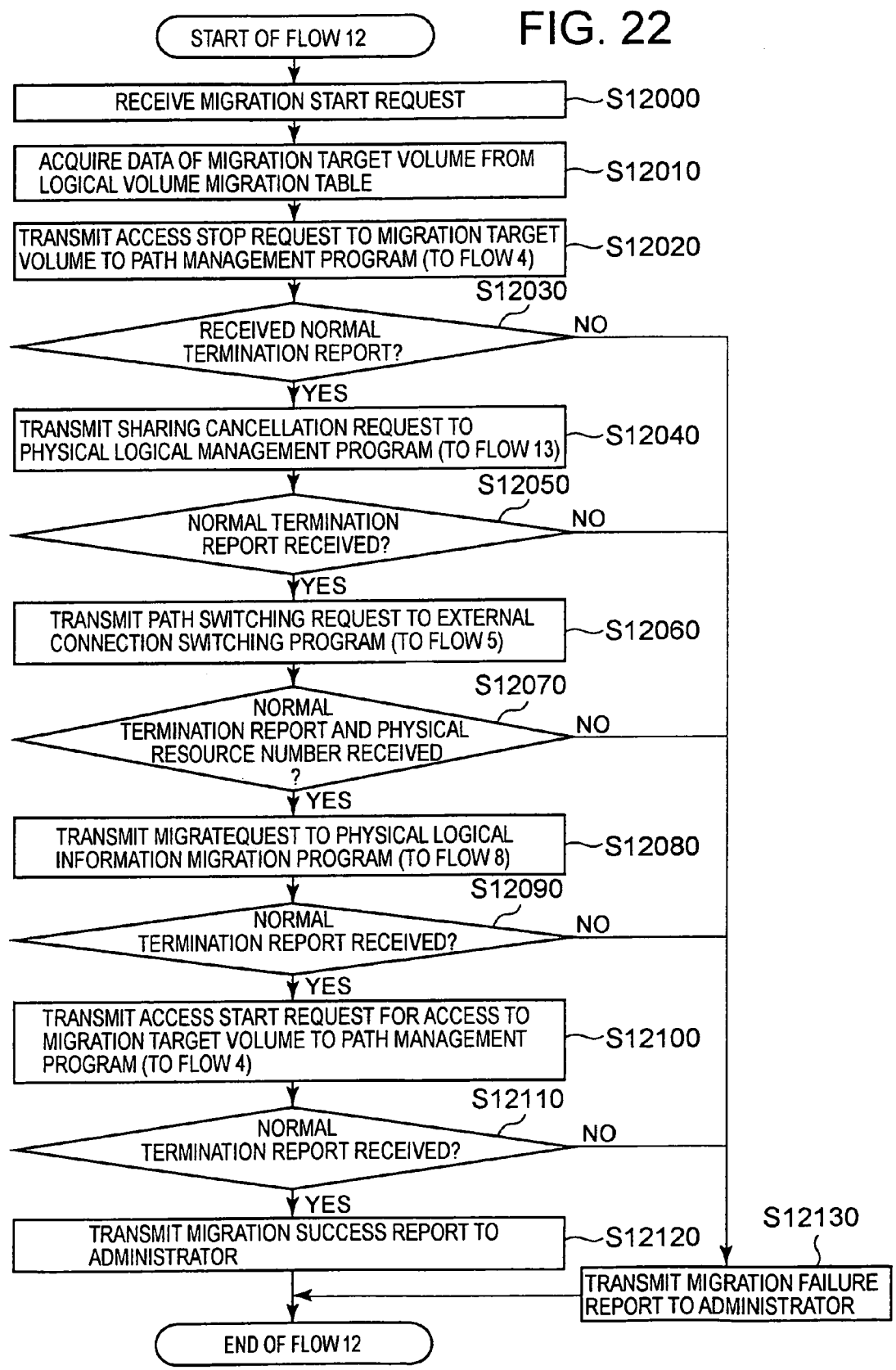

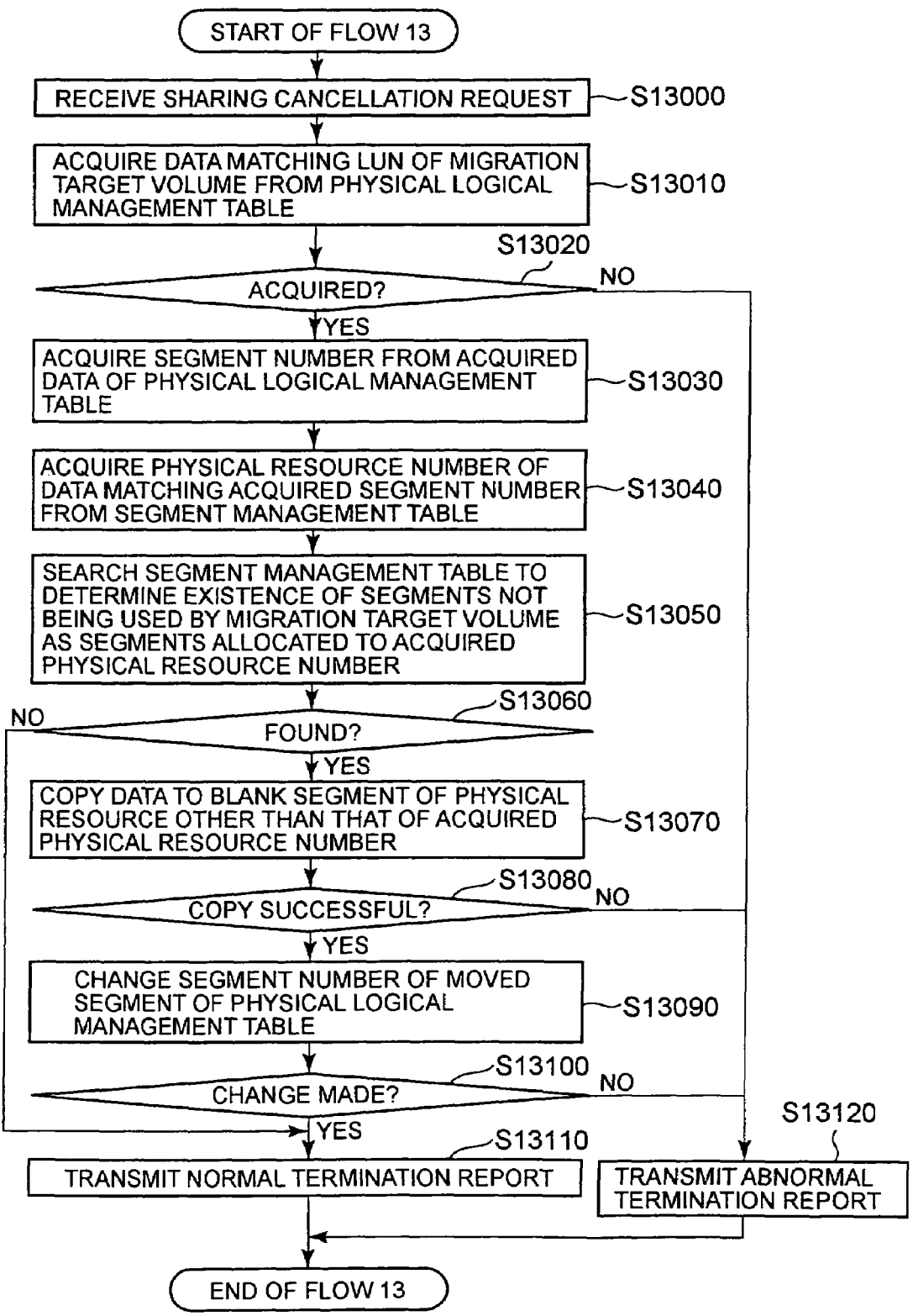

CAPACITY EXPANSION VOLUME MIGRATION METHOD

CROSS-REFERENCE TO PRIOR APPLICATION

This application relates to and claims priority from Japanese Patent Application No. 2006-106098, filed on Apr. 7, 2006 the entire disclosure of which is incorporated herein by reference.

BACKGROUND

The present invention relates to the migration of a logical volume that is connected to a host computer.

In recent years, the amount of data saved in computer systems has been increasing rapidly. Hence, storage systems with large-scale storage capacities have been adopted in computer systems that store increasing amounts of data.

Storage systems provide storage areas in units called logical volumes in host computers. Generally, the storage capacity of logical volumes is fixed but the technology disclosed in Japanese Patent Application Laid Open No. 2003-015915 for increasing the usage efficiency of storage areas, that is, technology for automatically expanding the storage capacity of logical volumes by allocating a partial area ('segment' hereinbelow) of a physical resource to a logical volume in accordance with an access request from a host computer has been invented. Further, in this specification, a logical volume of expanded capacity is known as a 'capacity-expansion volume'. A capacity-expansion volume is a logical volume that can be provided by Thin Provisioning Technology and a capacity-expansion volume is also called a 'Thin Provisioning volume'. Further, the 'physical resources' as they are called in this specification are logical storage devices (logical devices) that are provided on a physical storage area. A physical storage area may be a storage area that is provided by one physical storage device or may be a storage device that is provided by a RAID group that is a group that complies with RAID (Redundant Array of Independent Disks) rules (also called a 'parity group' or an 'array group'). A RAID group is a storage device group that is constituted by a plurality of physical storage devices (hard disk drives, for example).

However, when an operation that uses a storage system is continued, data of a low usage frequency is sometimes saved as is on a highly reliable, responsive and durable expensive disk. In this case, there is the problem that the expensive disk capacity is used more than is necessary and the expensive disk cannot be used efficiently. Hence, a technology that migrates data from the expensive disk to an inexpensive disk the reliability, responsiveness, and durability of which are inferior to those of the expensive disk has been invented (See Japanese Patent Application Laid Open No. 2003-345522, for example).

Further, when a fault occurs in a first storage system or the like, for example, the capacity-expansion volume connected to the host computer is migrated from the first storage system to a second storage system. More specifically, the capacity-expansion volume connected to the host computer is switched from the first capacity-expansion volume in the first storage system to the second capacity-expansion volume in the second storage system, for example.

When the capacity-expansion volume is migrated, the host computer must also read data that is the same as the data read from the capacity-expansion volume of the first storage system from the capacity-expansion volume of the second storage system. Methods for implementing this reading include a method that migrates data in the migration-source capacity-expansion volume to the migration-destination capacity-expansion volume.

However, the following two problems exist with this method.

The first problem is that a data copy is produced between storage systems That is, the migration of data ends as a result of copy-source data being deleted when data is copied between storage systems. Therefore, the data copying takes time and there is a load on the storage system. This is a larger problem when the data to be migrated exists in large quantities.

As a second problem, when an external connection function (described subsequently) is installed in the first and second storage systems and first and second external storage systems are connected to the first and second storage systems, an area that is blank enough to provide the second external volume, which has the same storage capacity as the external storage device comprising data to be migrated (the logical volume in the first external storage system, for example) must be provided in the second external storage system. Hence, when such a blank area cannot be provided in the second external storage system, data cannot be migrated and, consequently, the capacity-expansion volume connected to the host computer cannot be switched.

SUMMARY

Therefore, an object of the present invention is to suppress the load of the storage system at the time of the migration of the capacity-expansion volume.

A further object of the present invention is to prevent an increase in the time interval required to migration the capacity-expansion volume even when data is stored in large quantities in the capacity-expansion volume.

A further object of the present invention is to complete the migration even without securing a blank area beforehand in the external storage system in order to migration the capacity-expansion volume.

The computer system according to the present invention comprises a host computer; a plurality of storage systems comprising first and second storage systems; an external storage system constituting an external storage system for the plurality of storage systems; and a management computer. The first and second storage systems comprise a pool constituted by a plurality of storage areas; and a controller that executes capacity-expansion processing that allocates a storage area in the pool to a capacity-expansion volume and cancels the allocation. An external connection path, which is a communication channel linking one or more storage areas in the pool that at least the first storage system comprises and an external storage device which is a storage device that the external storage system comprises, is provided between the one or more storage areas and the external storage device. A host connection path, which is a communication channel that links the host computer and a capacity-expansion volume of the first storage system, is provided between the host computer and the capacity-expansion volume. When an access request is issued from the host computer via the host connection path and the host computer accesses to a storage area that is allocated to the capacity-expansion volume in accordance with the access request, the host computer accesses via the external connection path to an external storage device connected to the storage area. The plurality of storage areas may be virtual storage areas (for example, areas that do not exist as real storage areas which represented by an ID), or may be storage resources that are provided by a plurality of physical storage devices (hard disk drives, for example). That is, a real storage resource that stores data may exist in the external storage system or the storage system need not comprise a real storage resource. Further, each storage system may be a system that is virtually established in one computer. The management computer comprises: a capacity expansion volume migration section that migrates a capacity-expansion volume that the first storage system comprises to the second storage system; a host connection path switching section that switches the host connection path being used from a first host connection path that links a migration source capacity-expansion volume and the host computer to a second host connection path that links a migration destination capacity-expansion volume and the host computer; and an external connection path switching section that switches the external connection path being used from a first external connection path that links a storage area allocated to the migration source capacity-expansion volume and the external storage device to a second external-connection path that links a storage area that is allocated to the migration destination capacity-expansion volume and the external storage device.

In a first embodiment, the controller of the first storage system may store capacity expansion management information that is information for managing which storage area is allocated to which capacity-expansion volume. In this case, the management computer can further comprise a management information setting section. The management information setting section can acquire the capacity expansion management information from the controller of the first storage system and set the acquired capacity expansion management information for the controller of the second storage system.

In a second embodiment, the management information setting section according to the first embodiment is able to convert the acquired capacity expansion management information on the basis of a storage area allocated to the migration destination capacity-expansion volume and set the converted capacity expansion management information for the controller of the second storage system.

In a third embodiment, the external connection path switching section is able to transmit a path cancellation request which is a request to cancel the first external connection path to the controller of the first storage system. As a result, the first external connection path is cancelled. The external connection path switching section is also able to transmit a path setting request that contains information relating to the external storage device to the controller of the second storage system. As a result, the second external connection path, which links the external storage device and a storage area allocated to the migration destination capacity-expansion volume that is a storage area that has not been allocated in the second storage system, is provided.

In a fourth embodiment, the controller of the first storage system according to the third embodiment may store capacity expansion management information constituting information for managing which storage area is allocated to which capacity-expansion volume. In this case, the management computer further comprises a management information setting section. The management information setting section is able to acquire the capacity expansion management information from the controller of the first storage system, convert the acquired capacity expansion management information to capacity expansion management information that represents the fact that the unallocated storage area has been allocated to the acquired migration destination capacity-expansion volume, and set the converted capacity expansion management information for the controller of the second storage system.

In a fifth embodiment, both the first external connection path and the second external connection path may be connected to the external storage device. The controller of the first storage system and the controller of the second storage system maybe constituted such that both manage the status of the storage area in the storage system comprising each of the controllers and, when the status is shown as unmanageable, do not manage storage areas corresponding with the status. The external connection path switching section is able to transmit an unmanageable setting request which is a request to render the migration source capacity-expansion volume unmanageable to the controller of the first storage system. As a result, the status of the storage area allocated to the migration source capacity-expansion volume can be updated to unmanageable.

In a sixth embodiment, the pool may be constituted by a plurality of physical storage resources and each management storage resource may be constituted by one or more storage areas. Allocation to the capacity-expansion volume may be by units of storage areas and connection to the external storage device may be by units of physical storage resources.

In a seventh embodiment, the first storage system according to the sixth embodiment comprises a plurality of capacity-expansion volumes comprising the migration source capacity-expansion volume, and a plurality of physical storage resources. As a result, a shared state in which the respective storage areas allocated to the plurality of capacity-expansion volumes are the constituent elements of the same physical storage resource can be produced. In this case, the capacity-expansion volume migration section is able to transmit a sharing cancellation request which is a request to cancel the shared state to the controller of the first storage system. As a result, the data in the segment allocated to the capacity-expansion volumes other than the migration source capacity-expansion volume among the data in the same physical storage resource are written to a segment of another physical storage resource among the plurality of physical storage resources and a predetermined response is sent back to the capacity expansion volume migration section. The capacity expansion volume migration section is able to migrate the capacity-expansion volume of the first storage system when the predetermined response is received.

In an eighth embodiment, the computer system can further comprise a storage section for storing processing management information constituting information representing types of processing that can be executed by the plurality of storage systems; and a migration destination candidate selection section. The selected migration destination candidate may be shown to the administrator and the migration destination candidate selected by the administrator may be the second storage system. Alternatively, the second storage system may be determined automatically from among the selected migration destination candidates.

In the ninth embodiment, the controller of the first storage system according to the eighth embodiment can comprise a storage section that stores external connection management information constituting information representing which storage area of the controller is connected to which external storage device and, when access is made to a storage area, external connection processing that accesses an external storage device that is connected to the storage area by specifying the external storage device on the basis of the external connection management information can be executed. In this case, the migration destination candidate selection section is able to select a storage system that possesses the external connection processing as the migration destination candidate in addition to the capacity-expansion processing.

Further, in the present invention, for example, one or a plurality of switch devices exist between the host computer and respective storage systems and communications between the host computer and each of the storage systems may be performed via one or more switch devices. In this case, the external connection processing may be executed by the host computer or switch devices instead of by the storage system.

In a tenth embodiment, the capacity expansion volume migration section is able to execute the migration of the capacity-expansion volume upon sensing an instruction from the administrator or the high load of the first storage system.

In the eleventh embodiment, the capacity expansion volume migration section is able to execute the migration of the capacity-expansion volume after transmitting an access stop request constituting a request not to issue an access request to the migration source capacity-expansion volume to the host computer and, when the migration is complete, transmit an access permission request which is a request that indicates that an access request may be issued to the transmission destination capacity-expansion volume to the host computer.

Each of the abovementioned parts may also be referred to as the respective means. The respective parts can also be implemented by hardware (circuits, for example), computer programs, or a combination thereof (for example, one or a plurality of CPUs that read and execute the computer programs) Each computer program can be read from storage resources (memory, for example) that are provided in a computer machine. The storage resources can also be installed via a recording medium such as a CD-ROM, DVD (Digital Versatile Disk), or the like, or can be downloaded via a communication network such as the Internet or a LAN.

BRIEF DESCRIPTION OF THE DRAWINGS

FIG. 2 shows a constitutional example of an external storage management table of the first embodiment;

FIG. 3 shows a constitutional example of the configuration of a physical logical management table of the first embodiment;

FIG. 4 shows a constitutional example of a segment management table of the first embodiment;

FIG. 5A shows an example of the volume configuration of the first embodiment;

FIG. 5B is a physical logical management table in the event of the volume configuration in FIG. 5A, FIG. 5C is a segment management table in the event of the volume configuration in FIG. 5A;

FIG. 6 shows a constitutional example of the storage information management table of the first embodiment;

FIG. 7 shows a constitutional example of a logical volume migration table of the first embodiment;

FIG. 8 shows a constitutional example of a path management table of the first embodiment;

FIG. 9 shows an example of the screen of a migration destination storage setting program of the first embodiment;

FIG. 19 shows a constitutional example of the segment management table of the second embodiment;

FIG. 22 shows the migration processing by the capacity-expansion volume migration program of a third embodiment;

FIG. 23 shows the sharing cancellation processing of the physical logical management program of the third embodiment;

DESCRIPTION OF THE PREFERRED EMBODIMENTS

A few embodiments of the present invention will be described hereinbelow with reference to the drawings. The present invention is not limited to or by these embodiments.

First Embodiment (1) System Constitution of the First Embodiment

Figure 1:
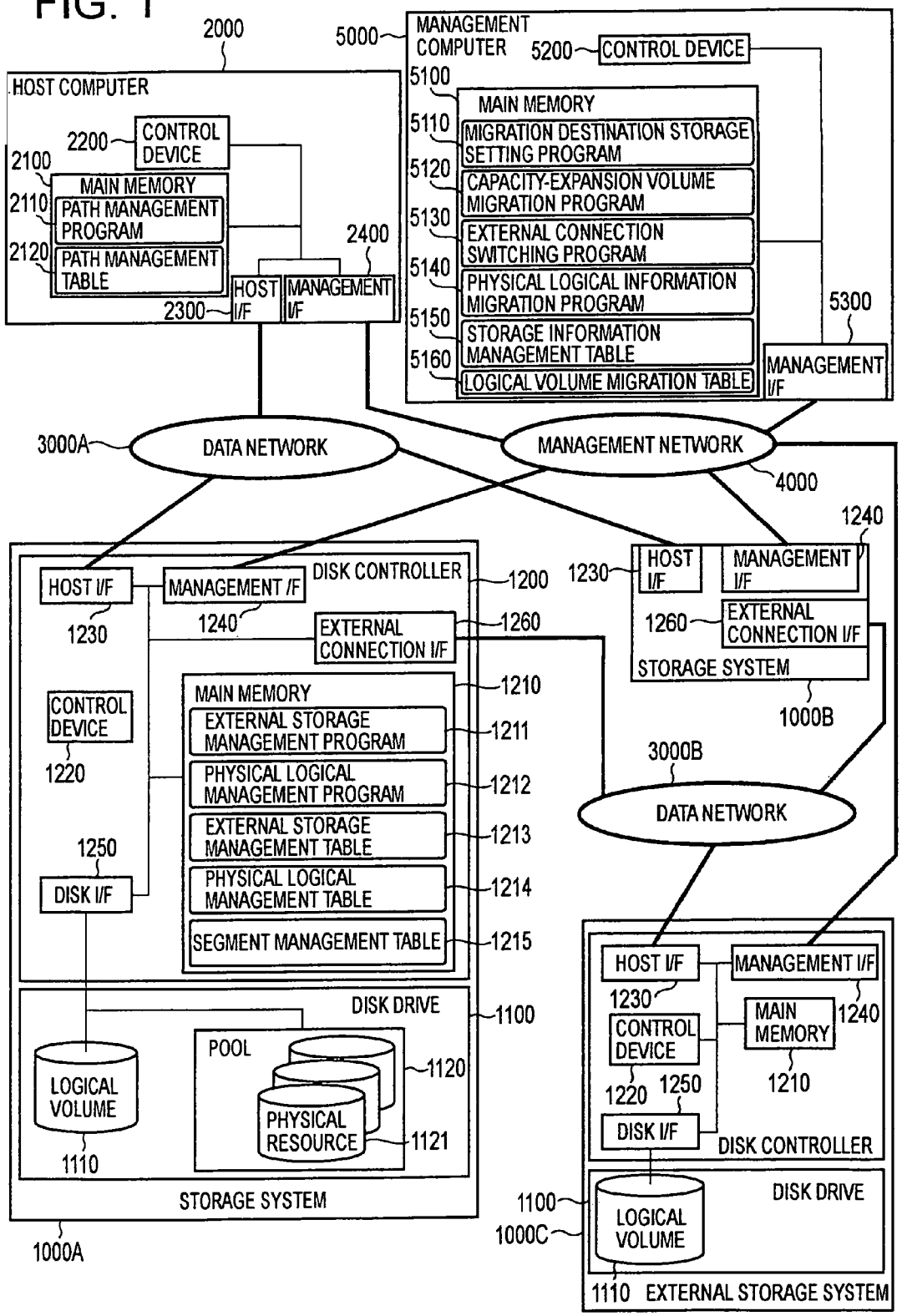
FIG. 1 shows a constitutional example of a computer system according to the first embodiment of the present invention.

FIG. 1 shows the constitution of the computer system of this embodiment. Further, in FIG. 1, the same parent number (1000, for example) is assigned to elements of the same type.

In the computer system according to this embodiment, a plurality (two, for example) of storage systems 1000A and 1000B and a host computer 2000 are connected to a data network 3000A. Further, the plurality of storage systems 1000A and 1010B and the external storage system 1000C are connected to another data network 3000B. Further, although data networks 3000A and 3000B are shown as different data networks in FIG. 1, one data network is also acceptable. The data networks 3000A and 3000B are SANs (Storage Area Networks) but may also be IP (Internet Protocol) networks or other data communication networks. Further, in this embodiment, a storage system comprising a capacity-expansion volume that can be connected to the host computer 2000 is referred to simply as a 'storage system', while storage systems that exist outside the storage system are called 'external storage systems'.

The host computer 2000, storage systems 1000A and 1000B, and external storage system 1000C are connected to a management computer 5000 via a management network 4000. In this embodiment, the management network 4000 is an IP network but may also be a SAN or another data communication network. Further, the data networks 3000 and management networks 4000 may be one network or the host computer 2000 and management computer 5000 may be one computer.

Further, for the sake of expedience in the description, there are two storage systems, one external storage system, one host computer, and one management computer in FIG. 1. However, the numbers are of no object for the present invention. Further, the storage systems 1000A and 1000B may each be virtual storage systems that are established in one storage system.

The storage systems 1000A, 1000B, and external storage system 1000C can adopt the same hardware constitution. Hence, the storage system 1000A will be described as a representative example. Further, in the following description, a capacity-expansion volume is moved from the storage system 1000A to the storage system 1000B and, therefore, the storage system 1000A is also called the 'migration source storage system 1000A' and the storage system 1000B is also called the 'migration destinations storage system 1000B'.

The storage system 1000A comprises a disk drive 1100 for storing data and a disk controller 1200 for performing control within the storage system 1000A.

The disk drive 1100 comprises a plurality of physical storage devices (hard disk drive, for example). The disk drive 1100 comprises one or more logical volumes 1110 and a pool 1120. The logical volume 1110 is generated by one or more physical resources 1121 and is capable of storing data used by the host computer 2000. Furthers although there is one pool 1120 in FIG. 1 for the sake of expediency in the description, such numbers are of no object to the present invention.

The pool 1120 comprises one or more physical resources 1121. The pool 1120 is a logical physical resource group for managing a plurality of physical resources 1121 altogether from a management perspective. From a management perspective, there are RAID types, for example. Examples of RAID types include RAID0, which brings a plurality of hard disks together as one to supply a high-capacity storage area and RAID1, which performs mirroring between hard disks in order to increase the redundancy of the hard disks.

The disk controller 1200 comprises a main memory 1210, a control device 1220, a host I/F 1230, a management I/F 1240, a disk I/F 1250, and an external connection I/F 1260. Further, the external storage system 1010C may not comprise an external connection I/F.

The main memory 1210 stores an external storage management program 1211, a physical logical management program 1212, an external storage management table 1213, a physical logical management table 1214, and a segment management table 1215. The external storage management program 1211 is a computer program that references or updates information on the external storage management table 1213 and controls the connection between the storage system 1000 and external storage system 1000. The physical logical management program 1212 is a computer program that references or updates the information of the physical logical management table 1214 and segment management table 1215 and manages configuration information on the capacity-expansion volume. Further, the external storage system 1000C may store the external storage management program 1211, physical logical management program 1212, external storage management table 1213, physical logical management table 1214, and segment management table 1215.

The control device 1220 is a CPU (Central Processing Unit), for example, which reads and executes the external storage management program 1211 and physical logical management program 1212 stored in the main memory 1210.

The host I/F 1230 is an interface with the data network 3000A or 3000B that sends and receives data and control commands to and from the host computer 2000. The management I/F 1240 is an interface with the management network 4000 that sends and receives data and control commands to and from the host computer 2000 and the management computer 5000. The disk I/F 1250 is an interface for the disk drive 1100 that sends and receives data and control commands and so forth. The external connection I/F 1260 is an interface with the data network 3000B that sends and receives data and control commands and so forth to and from the external storage system 1000C.

The host computer 2000 comprises a main memory 2100, a control device 2200, and a host I/F and management I/F 2400. Further, the host computer 2000 may comprise an input device (keyboard, for example) and an output device (display device, for example) and so forth that are omitted from the drawings.

The main memory 2100 stores a path management program 2110 and a path management table 2120. The path management program 2110 is a computer program that manages the path that is the access route to the logical volume 1110 of the storage systems 1000A and 1000B and, by referencing or updating the information on the path management table 2120, manages which path is currently valid when a plurality of paths exists.

The control device 2200 is a CPU, for example, that reads and executes the path management program 2110 stored in the main memory 2100.

The host I/F 2300 is an interface with the data network 3000A that sends and receives data and control commands and so forth to and from the storage systems 1000A and 1000B. The management I/F 2400 is an interface with the management network 4000 that sends and receives data and control commands and so forth to and from the storage systems 1000A and 1000B and the management computer 5000.

The management computer 5000 comprises a main memory 5100, a control device 5200, and a management I/F 5300. Further, the management computer 2000 may comprise an input device (a keyboard, for example) and an output device (a display device, for example) that are omitted from the drawings.

The main memory 5100 stores a migration destination storage setting program 5110, a capacity-expansion volume migration program 5120, an external connection switching program 5130, a physical logical information migration program 5140, a storage in formation management table 5150, and a logical volume migration table 5160. The migration destination storage setting program 5110 is a computer program that references information on the storage information management table 5150 and registers the migration destination storage system in the logical volume migration table 5160. The capacity-expansion volume migration program 5120 is a computer program that calls up the path management program 2110, external connection switching program 5130, and physical logical information migration program 5140, and migrations the capacity-expansion volume to a different storage system 1000. The external connection switching program 5130 is a computer program that calls up the external storage management program 1211 and switches the connection settings of the migration source storage system 1000A, migration destination storage system 1000B, and external storage system 1000C. The physical logical information migration program 5140 is a computer program that calls up the physical logical management program 1212, acquires the physical logical management table 1214 and segment management table 1215 of the migration source storage system 1000 and performs settings on the migration destination storage system 1000 after converting the physical logical management table 1214 and segment management table 1215 to information that is suitable for the migration destination storage system 1000.

The control device 5200 reads and executes a variety of computer programs 5110, 5120, 5130, and 5140 that are stored in the main memory 5100.

The management I/F 5300 is an interface with the management network 4000 that sends and receives data and control commands and so forth to and from the storage system 1000 and host computer 2000.

FIG. 2 shows a constitutional example of the external storage management table 1213 of the storage system 1000A.

The external storage management table 1213 comprises, as connection information of the storage system 1000A and external storage system 1000C, a physical resource number T100 and external volume information T110, for example.

The physical resource number T100 stores information for identifying physical resources 1121 that are associated with the logical volume 1100 that the external storage system 1000C comprises. T110 stores information for identifying the logical volume 1100 of the external storage system 1000 as external volume information. Further, for the sake of expediency in the description, information for identifying the logical volume 1100 that the external storage system 100C comprises is represented as information produced by combining the model name of the external storage system, the serial number, and the LUN (Logical Unit Number) allocated to the logical volume. However, as long as the information allows the logical volume to be identified, the format is not important.

FIG. 3 shows a constitutional example of the physical logical management table 1214 that the storage system 1000A comprises.

The physical logical management table 1214 has, as information identifying the constitution of the capacity-expansion volume, a LUN T200, a segment number T210, a start address T220, and an end address T230, for example.

The LUN T200 stores a number for identifying the logical volume 1110. The segment number T210 stores a number for identifying the segment allocated to the capacity-expansion volume. The start address T220 and end address T230 represent the start address and end address of the logical volume supplied to the host computer 2000. The address of the logical volume includes the generally used LBA (Logical Block Address).

FIG. 4 shows the segment management table 1215 that the storage system 1000A comprises.

The segment management table 1215 has, as information for managing segments, a pool number T300, a physical resource number T310, a segment number T320, a start address T330, an end address T340, and a usage condition T350, for example.

The pool number T300 stores information for identifying the pool 1120. The physical resource number T310 stores information for identifying the physical resources 1121. The segment number T320 stores information for identifying a segment, which is the unit in which the physical resources 1121 are logically divided into certain logical sizes. The start address T330 and end address T340 represents the start addresses and end addresses of each of the segments on the physical resources 1121 Addresses of the physical resource include the generally used LBA. The usage condition T350 stores information representing whether a segment has been allocated to a capacity-expansion volume (one type of logical volume 1110). Usage conditions include 'allocated' which represents the fact that a segment has been allocated to a capacity-expansion volume and 'unallocated', which represents the fact that a segment has not been allocated to a capacity-expansion volume, for example. Further, although FIG. 4 represents the usage condition as a character string for the sake of expediency, a number or the like that makes it possible to identify the usage condition may be stored in place of the character string.

FIG. 5 shows a constitutional example of the capacity-expansion volume 1110 of this embodiment and a specific example of the physical logical management table 1211 and segment management table 1214 of the constitutional example.

As shown in FIG. 5A, the capacity-expansion volume 1110 is constituted by one or a plurality of segments. In the example of FIG. 5A, the capacity-expansion volume 1110 is constituted by allocating a segment of the first physical resource (physical resource 1) 1121 of the first pool area (pool 1) 1120 and a segment of the second physical resource (physical resource 2) 1121 of the same pool area (pool 1) 1120.

In this case, the LUN T200 of the physical logical management table 1211 (FIG. 5B) stores '0', which is the LUN of the logical volume 1110 as a number permitting the host computer 2000 to identify the capacity-expansion volume 1110. Further, the segment number T210 stores '1' and '3', which are the identification numbers of the segments allocated to the capacity-expansion volume 1110 and stores 'NULL' for the areas to which a segment has not been allocated. Further, although 'NULL' is stored in the unallocated areas in FIG. 5B for the sake of expediency, other character strings and numbers and so forth that signify unallocated may be stored in place of 'NULL' The start address T220 and end address T230 of the physical logical management table 1211 store the addresses of the respective areas 1110 (the respective areas of the capacity-expansion volume) that are used by the host computer 2000.

As shown in FIG. 5C, the pool number T300 of the segment management table 1214 then stores '1', which is the identification number of the first pool area 1120. Further, in this example, the first pool area 1120 is constituted by first and second physical resources 1121 of which the physical resource numbers are '0' and '1', these numerical values being stored by the physical resource number T310.

In addition, as shown in FIG. 5A, in this example, the first and second physical resources are both constituted by three segments and the segment numbers '0' to '5' are assigned to the respective segments. Therefore, the numerical values are stored in the segment number T320 of the segment management table 1214.

In addition, the start address T330 and end address T340 specifically store the start address and end address of the respective segments and the respective usage conditions T350 store the usage conditions 'unallocated' or 'allocated' of the corresponding segments. In this example, because the respective segments the segment numbers of which are '1' and '3' are allocated to the logical volume 1110, the corresponding usage conditions T350 store the information 'allocated' and the usage conditions T350 corresponding with other segments store the information 'unallocated'.

FIG. 6 shows the constitutional example of the storage information management table 5150 of this embodiment.

The storage information management table 5150 has a model name T400, a serial number T410, and function information T420, for example, as the information for managing the functions of the storage system 1000.

The model name T400 stores information showing the type of storage system 1000. The serial number T410 stores information for identifying the storage system 1000. Further, in this specification, for the sake of expediency, a model name T400 and serial number T410 are used as information for uniquely identifying the storage system 1000. However, as long as the storage system 1000 can be uniquely identified, different information may be used. The function information T420 stores information indicating the functions of the storage system 1000. Information that corresponds to the function information T420 includes license information corresponding to the functions of the storage system 1000, for example. Although the function information T420 is used in this specification for the sake of expediency, information that permits identification of the functions that the storage system 1000 comprises such as license information may also be used. Further, the illustrated 'capacity-expansion volume function' is a function that automatically changes the size of a logical volume by increasing or decreasing the segment allocated to the logical volume as described with reference to FIG. 5A. Further, the 'external connection function' is a function that supplies the storage resources of the external storage system 1000C to the host computer as its own storage resources. In this embodiment, as is clear from the external storage management table 1213 exemplified by FIG. 2, the logical volume (called the 'external volume' for the sake of expediency hereinbelow) 1110 of the external storage system 1000C is associated with one physical resource. Therefore, when the storage system 1000A has an external connection function and the external volume is associated with the physical resources of the storage system 1000A as a result of the external storage management table 1213, for example, if a segment of a capacity-expansion volume of the storage system 1000A is the access destination from the host computer 2000, the access destination of the host computer 2000 can substantially be made the external volume as a result of the storage system 1000A specifying the external volume associated with the physical resource of the segment from the external storage management table 1213 and the storage system 1000A accessing the external volume.

FIG. 7 shows a constitutional example of the logical volume migration table 5160 of this embodiment.

The logical volume migration table 5160 comprises, for the purpose of managing the migration destination of the logical volume, a migration source model name T500, a migration source serial number T510, a migration source LUN T520, a migration destination model name T530, a migration destination serial number T540, a migration destination LUN T550, for example.

The migration source model name T500 stores information indicating the type of migration source storage system 1000. The migration source serial number T520 stores information for identifying the migration source storage system 1000. The migration source LUN T520 stores the LUN of the migration source storage system allocated to the migration target volume. The migration destination model name T530 stores information indicating the type of migration destination storage system 1000. The migration destination serial number T540 stores information for identifying the migration destination storage system 1000. The migration destination LUN T550 stores the LUN of the migration destination storage system allocated to the migration target volume.

FIG. 8 shows a constitutional example of the path management table 2120 of this embodiment.

The path management table 2120 has, as information for managing one or a plurality of paths, path identification information T600, connection destination storage information T610, and an access flag T620, for example.

The path identification information T600 stores information whereby the OS (Operating System) on the host computer uniquely identifies the logical volume 1110 of the storage system 1000. Further, although this information is indicated by numerals for the sake of expediency in this specification, a character string that makes it possible to uniquely identify the path within the OS may be stored in place of the numerals. The connection destination storage information T610 stores information for accessing the logical volume 1100 of the storage system 1000. Further, for the sake of expediency in the description, information for accessing the logical volume 1100 is represented as information rendered by combining the model name of the storage system 1000, the serial number, and the LUN allocated to the logical volume 1110. However, the format is unimportant as long as the information is that required in order to access the logical volume. The access flag T630 stores information indicating whether the logical volume 1110 indicated by the connection destination storage information T610 is accessible. Further, although the access flag is represented as a character string in FIG. 8 for the sake of expediency, numerals that make it possible to identify whether the logical volume 1110 is accessible may be stored in place of the character string.

FIG. 9 shows a specific example of a migration destination storage system setting screen D100 that the migration destination storage setting program 5110 of this embodiment presents to the administrator.

The migration destination storage system setting screen D100 is a screen for setting the migration destination storage system that migrates data that comprises a migration destination storage system selection dialog D110, a migration destination logical volume setting box D120, a setting button D130, and a cancel button D140. The migration destination storage system selection dialog D110 is a dialog box that shows the candidates for the migration destination storage system 1000 as a list and allows the administrator to select a migration destination storage system. The migration destination logical volume setting box D120 is a box for setting the LUN that is allocated to the migration destination storage system 1000. The setting button D130 is a button that reflects the setting content displayed by the screen when the button is pressed down. The cancel button D140 is a button that discards the setting content displayed by the screen and closes the screen when the button is pressed down.

(2) Operation of the First Embodiment

Figure 10:
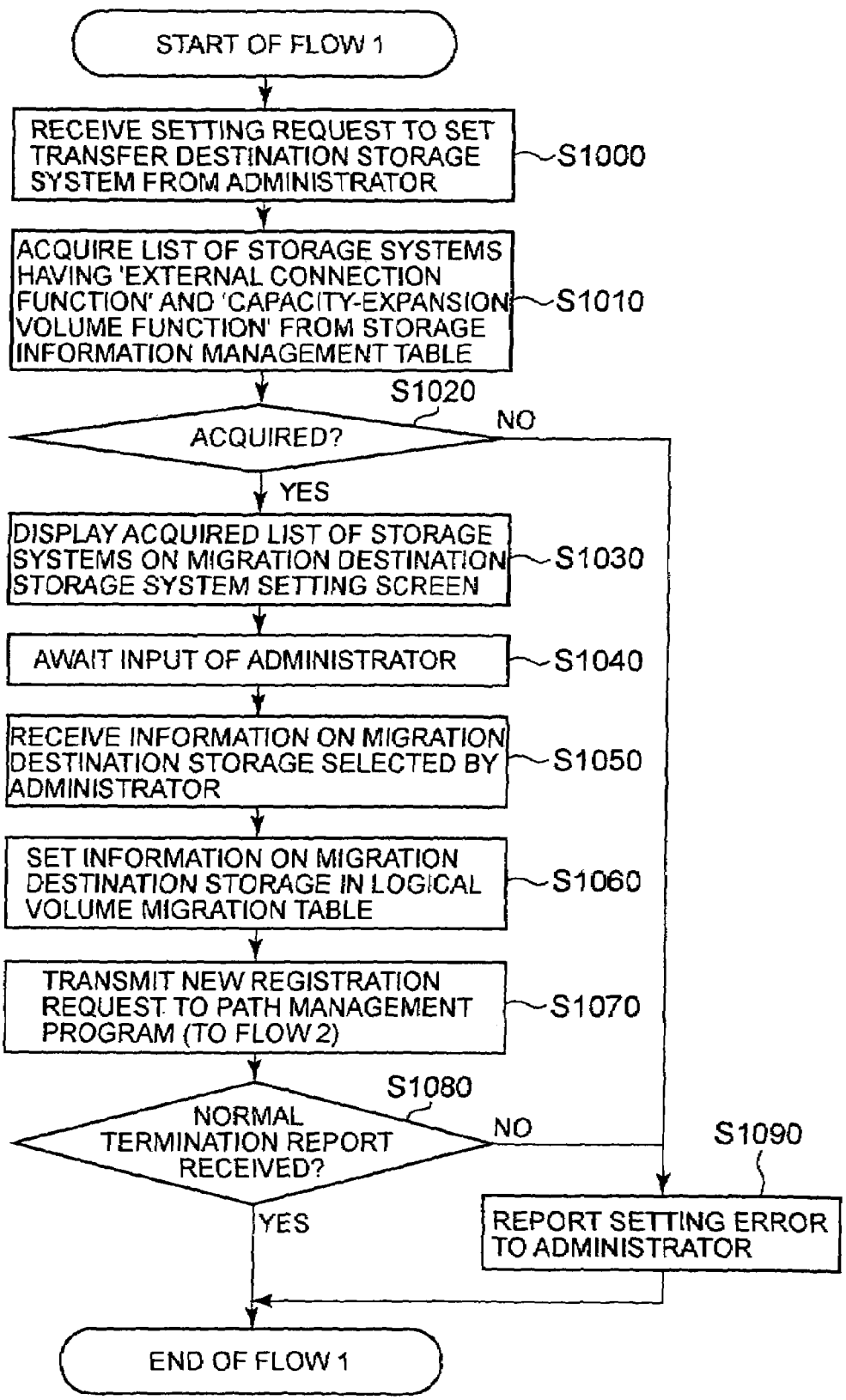
FIG. 10 shows the setting processing of the migration destination storage setting program of the first embodiment.

First, the processing of the migration destination storage setting program 5110 will now be described with reference to FIG. 10.

The migration destination storage setting program 5110 receives a setting request to set the migration destination storage system that includes the LUN that is information identifying the migration target volume and the model name and serial number of the migration source storage system 1000 from the administrator (S1000).

Thereafter, the migration destination storage setting program 5110 acquires the model name T400 and serial number T410 of the storage system from the row with 'external connection function' and 'capacity-expansion volume' in the function information T420 of the storage information management table 5150 (S1010).

The migration destination storage setting program 5110 judges whether the acquisition processing of S1010 has succeeded (S1020).

As the acquisition fails as a result of the judgment (No in S1020), the migration destination storage setting program 5110 notifies the administrator or a setting error and ends the processing (S1090). Methods of communicating errors to the administrator include an output to the display device that the administration computer comprises and electronic mail communication methods.

When acquisition has succeeded as a result of the judgment (Yes in S1020), the migration destination storage setting program 5110 opens the migration destination storage system setting screen D100 that contains the model name and serial number of the acquired migration destination storage system, the LUN constituting the identification information of the migration target volume, and the model name and serial number of the migration source storage system (S1030). The migration destination storage system selection dialog D110 displays the model name and serial number of the acquired migration destination storage system as a list in a pulldown format, for example.

Thereafter, the migration destination storage setting program 5110 waits for the administrator to input information to the migration destination storage system setting screen D100 and for the setting button D130 to be pressed down (S1040).

When the setting button D130 is pressed down, the migration destination storage setting program 5110 receives the model name and serial number of the migration destination storage system selected by the administrator and the LUN of the migration destination logical volume (S1050).

Following receipt, the migration destination storage setting program 5110 writes the model name and serial number of the migration source storage system, the LUN of the migration target volume, the model name and serial number of the migration destination storage system received by this processing, and the LUN of the migration destination logical volume to the logical volume migration table 5160 (S1060).

Thereafter, the migration destination storage setting program 5110 transmits a new registration request containing the model name and serial number of the migration source storage system, the LUN of the migration target volume, the model name and serial number of the migration destination storage system received by this processing, and the LUN of the migration destination logical volume, to the path management program 2110 (S1070).

The migration destination storage setting program 5110 judges whether a normal termination report has been received from the path management program 2110 (S1080).

When the judgment result indicates that there has been no normal termination report (No in S1080), the migration destination storage setting program 5110 notifies the administrator of a setting error and ends the processing (S1090) When the judgment results indicates that a normal termination report has been received (Yes in S1080), the migration destination storage setting program 5110 terminates the processing. Further, although omitted for the sake of expediency in the description of FIG. 10, in cases where access restrictions have been set from the standpoint of security and so forth with respect to access by the host computer, the migration destination storage system may, following the processing in FIG. 10, report information on the host computer and the LUN of the migration destination logical volume to the migration destination storage system and settings permitting access by the migration destination logical volume may be performed by the host computer. The information on the host computer includes identification information on the host I/F 2300 that the host computer has, for example (WWN (World Wide Name), for example), for example.

Figure 11:
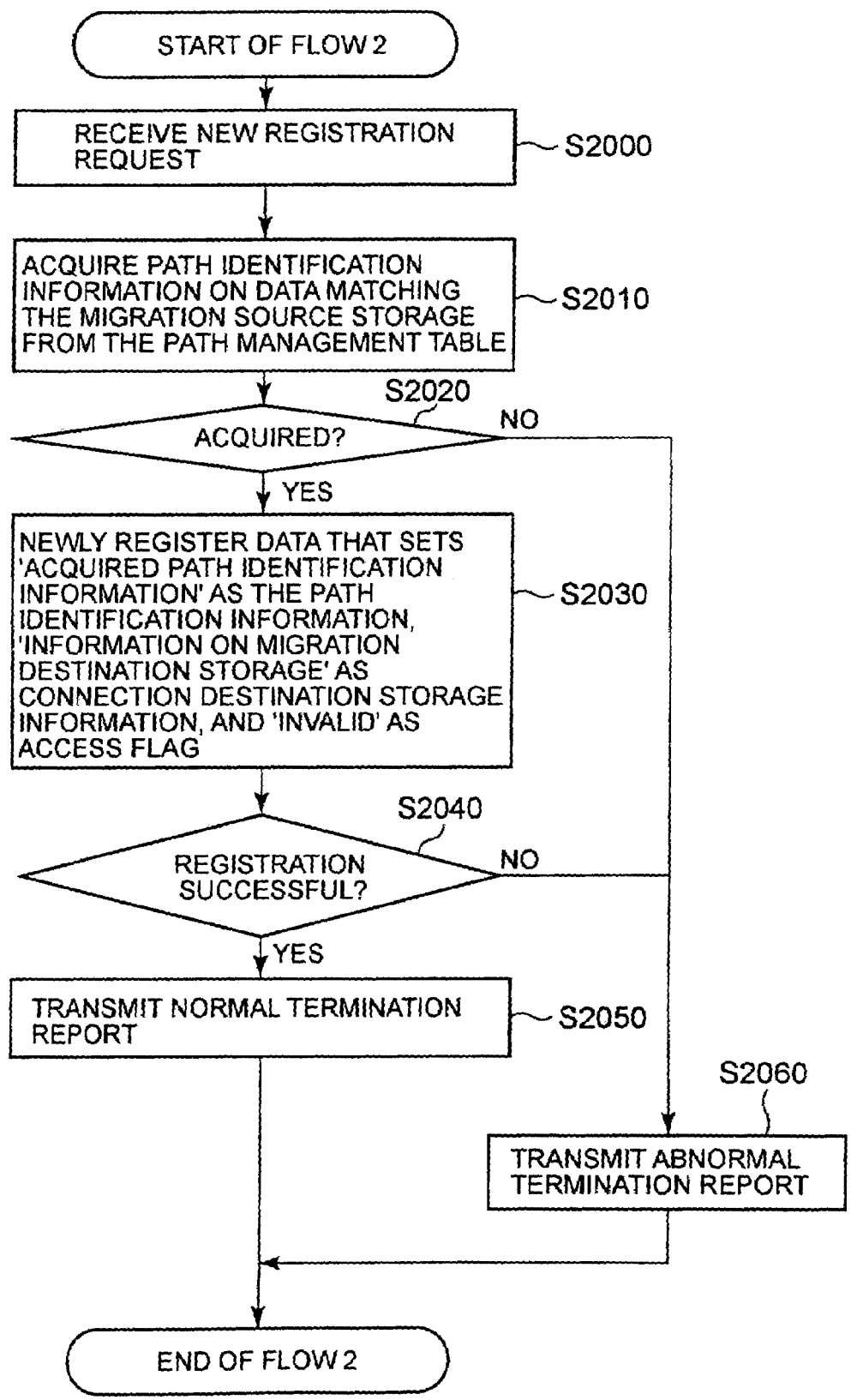
FIG. 11 shows the new registration processing of the path management program of the first embodiment.

New registration processing of the path management program 2110 will be described next with reference to FIG. 11.

The path management program 2110 receives a new registration request that contains the model name and serial number of the migration source storage system, the LUN of the migration target volume, the model name and serial number of the migration destination storage system, and the LUN of the migration destination logical volume from the migration destination storage setting program 5110 (S2000).

Thereafter, the path management program 2110 searches for data including the model name and serial number of the migration source storage system and the LUN of the migration target volume that are contained in the new registration request from the connection destination storage information T610 of the path management table 2120 and acquires the path identification information T600 of the data (S2010). Further, for the sake of expediency in this specification, the connection destination storage information T610 of the path management table 2120 is retrieved by means of a character string rendered by using periods to link the model name and serial number of the migration source storage system and the LUN of the migration target volume.

The path management program 2110 judges whether the path identification information T600 has been acquired (S2020).

When the judgment result is that the path identification information T600 has not been acquired (No in S2020), the path management program 2110 transmits an abnormal termination report to the calling source and terminates the processing (S2060). When the judgment result is that the path identification information T600 has been acquired (Yes in S2020), the path management program 2110 newly registers the acquired path identification information for the path identification information T600, a character string rendered by using periods to link the model name and serial number of the migration destination storage system contained in the request and the LUN of the migration target volume for the connection destination storage information T610, and 'invalid' for the access flag T620 (S2030).

The path management program 2110 judges whether the registration processing has succeeded (S2040).

When the result of the judgment is that the registration has failed (No in S2040), the path management program 2110 transmits an abnormal termination report to the calling source and terminates the processing (S2060). When the result of the judgment is that registration has succeeded (Yes in S2040), the path management program 2110 transmits the normal termination report to the calling source and terminates the processing (S2050).

Thereafter, the data migration processing of the capacity-expansion volume migration program 5120 will be described with reference to FIG. 12.

The capacity-expansion volume migration program 5120 receives a migration start request that contains identification information on the migration target volume (the model name and serial number of the migration source storage system and the LUN of the migration target volume, for example) that is called when the capacity-expansion volume undergoes a data migration, from the administrator or a performance monitoring program or the like that is omitted from this specification (S3000). Further, the performance monitoring program is a computer program that has a function for monitoring the load of the control device 1220 and the host I/F 1230 and so forth of the storage system 1000 and, when a predetermined threshold value has been exceeded, issuing a warning report to the administrator and calling another program and so forth.

Thereafter, the capacity-expansion volume migration program 5120 acquires data corresponding to the model name, serial number, and the LUN of the migration target volume of the migration source storage system contained in the request from the logical volume migration table 5160 (S3010).

Subsequently, the capacity-expansion volume migration program 5120 transmits an access stop request that contains the model name and serial number and the LUN of the migration target volume to the path management program 2110 in order to stop access by the host computer 2000 of the migration target volume (S3020).

The capacity-expansion volume migration program 5120 judges whether a normal termination report has been received from the path management program 2110 (S3030).

When the result of the judgment is that a normal termination report has not been received (No in S3030), the capacity-expansion volume migration program 5120 terminates the processing to transmit a migration failure report to the administrator (S3110). When the result of the judgment is that a normal termination report has been received (Yes in S3030), the capacity-expansion volume migration program 5120 transmits a path switching request that contains the model name and serial number of the migration source storage system, the LUN of the migration target volume, the model name and serial number of the migration destination storage system, and the LUN of the migration destination logical volume to the external connection switching program 5130 (S3040).

The capacity-expansion volume migration program 5120 judges whether a normal termination report and physical resource number have been received from the external connection switching program 5130 (S3050).

When the result of the judgment is that there is no normal termination report and no physical resource number (No in S3050), the capacity-expansion volume migration program 5120 terminates processing to transmit a migration failure notice to the administrator (S3110). When the result of the judgment is that there is a normal termination report and a physical resource number (Yes in S3050), the capacity-expansion volume migration program 5120 transmits a migrate request that contains a model name and serial number of the migration source storage system, the LUN of the migration target volume, the model name and serial number of the migration destination storage system, the LUN of the migration destination logical volume, and the acquired physical resource number to the physical logical information migration program 5140 (S3060).

The capacity-expansion volume migration program 5120 judges whether a normal termination report has been received from the physical logical information migration program 5140 (S3070).

When the judgment result is that there is no normal termination report (No in S3070), the capacity-expansion volume migration program 5120 transmits a migration failure report to the administrator and terminates the processing (S3110). When the judgment result is that there is a normal termination report (Yes in S3070), the capacity-expansion volume migration program 5120 transmits an access start request containing the model name and serial number of the migration destination storage system, and the LUN of the migration destination logical volume to the path management program 2110 (S3080).

The capacity-expansion volume migration program 5120 judges whether a normal termination notice has been received from the path management program 2110 (S3090).

When the judgment result is that there has been no normal termination report (No in S3090), the capacity-expansion volume migration program 5120 transmits a migration failure report to the administrator and terminates the processing (S3110). When the judgment result is that there has been a normal termination report (Yes in S3090), the capacity-expansion volume migration program 5120 transmits a migration success report to the administrator and terminates processing (S3100). Methods for reporting migration success to the administrator include an output to the display device that the administration computer comprises and electronic mail communication methods.

Figure 13:
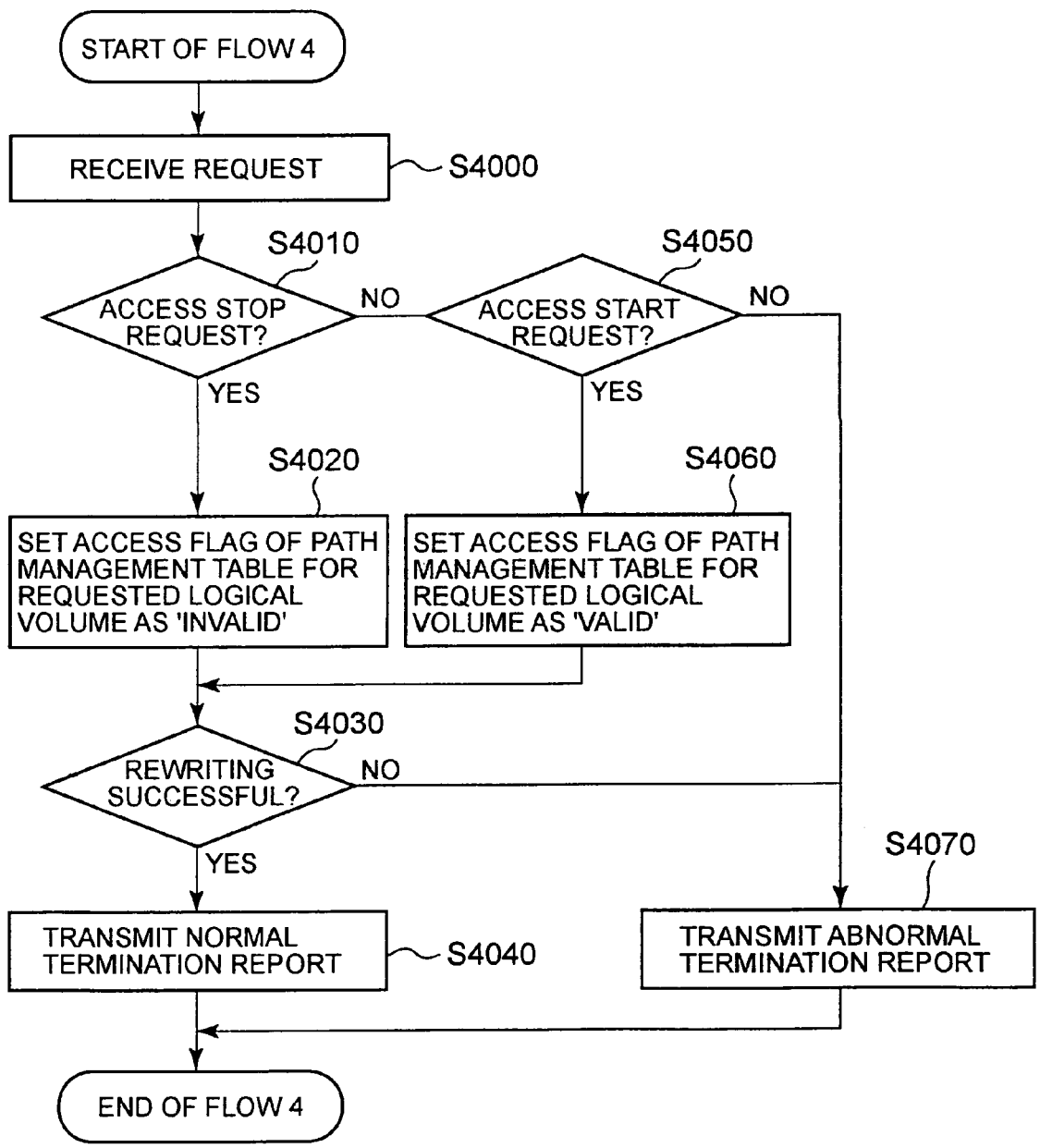
FIG. 13 shows access termination processing and access start processing of a path management program 1212 of the first embodiment.

The access termination processing and access start processing of the path management program 2110 will be described next with reference to FIG. 13.

The path management program 5120 receives requests which are any of an access stop request that contains the model name and serial number of the migration source storage system constituting identification information on the migration target volume, and the LUN of the migration target volume, or an access start request that contains the model name and serial number of the migration destination storage system and the LUN of the logical destination logical volume (S4000).

The path management program 5120 judges whether the received request is an access termination request (S4010).

When the judgment result is that there is an access stop request (Yes in S4010), the path management program 5120 sets the access flag T620 for the data of the path management table 2130 that corresponds with the model name and serial number of the migration source storage system and the LUN of the migration target volume that are contained in the request as 'invalid' (S4020).

It is subsequently judged whether the rewriting of the path management table 2130 has succeeded (S4030).

When the judgment result is that the rewriting has failed (No in S4030), the path management program 5120 transmits an abnormal termination report to the calling source and terminates the processing (S4070). When the judgment result is that the rewriting has succeeded (Yes in S4030), the path management program 5120 transmits a normal termination report to the calling source and terminates the processing (S4040).

When the result of judging whether the received request is an access stop request is that the received request is not an access stop request (No in S4010), the path management program 5120 judges whether there the received request is an access start request (S4050).

When the judgment result is that the received request is not an access start request (No in S4050), the path management program 5120 transmits an abnormal termination report to the calling source and terminates the processing (S4070). When the judgment result is that the received request is an access start request (Yes in S4050), the path management program 5120 sets the access flag T620 for the data of the path management table 2130 that corresponds with the model name and serial number of the migration destination storage system and the LUN of the migration destination logical volume that are contained in the request as 'valid' (S4060).

Thereafter, the path management program 5120 judges whether the rewriting of the path management table 2130 has succeeded (S4030).

When the judgment result is that the rewriting has failed (No in S4030), the path management program 5120 transmits an abnormal termination report to the calling source and terminates the processing (S4070). When judgment result is that the rewriting has succeeded (Yes in S4030), the path management program 5120 transmits a normal termination report to the calling source and terminates the processing (S4040).

Figure 14:
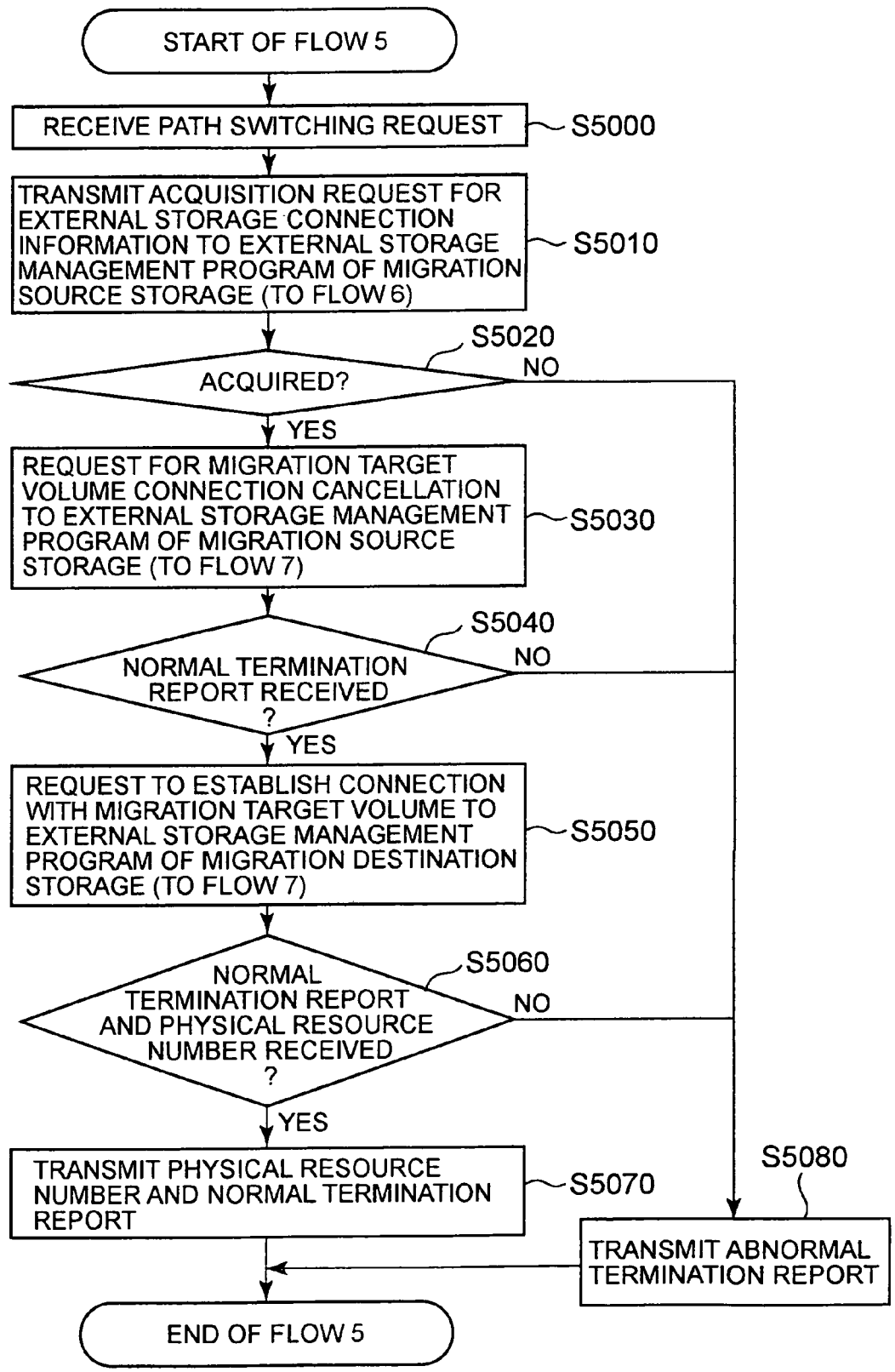
FIG. 14 shows path switching processing of an external connection switching program of the first embodiment.

The path switching processing of the external connection switching program 5130 will be described next with reference to FIG. 14.

The external connection switching program 5130 receives a path switching request that contains the model name and serial number of the migration source storage system constituting identification information on the migration target volume, the LUN of the migration target volume, the model name and serial number of the migration destination storage system, and the LUN of the migration destination logical volume (S5000).

Thereafter, the external connection switching program 5130 transmits a connection information acquisition request to the external storage system that contains the LUN of the migration target volume to the external storage management program 1211 of the storage system 1000 that is identified by the model name and serial number of the migration source storage (S5010).

Thereafter, the external connection switching program 5130 judges whether connection information has been acquired from the external storage management program 1211 (S5020).

When the judgment result is that the acquisition of the connection information has failed (No in S5020), the external connection switching program 5130 transmits an abnormal termination report to the calling source and terminates the processing (S5080). When the judgment result is that the acquisition of the connection information has succeeded (Yes in S5020), the external connection switching program 5130 transmits a connection cancellation request that contains the LUN of the migration target volume to the external storage management program 1211 of the storage system 1000 that is identified by the model name and serial number of the migration source storage (S5030).

Thereafter, it is judged whether a normal termination report has been received by the external storage management program 1211 (S5040).

When the judgment result is that a normal termination report has not been received (No in S5040), the external connection switching program 5130 transmits an abnormal termination report to the calling source and terminates the processing (S5080). When the judgment result is that a normal termination report has been received (Yes in S5040), the external connection switching program 5130 transmits a connection setting request that contains connection information for a connection with the external storage system thus acquired to the external storage management program 1211 of the storage system 1000 that is identified by the model name and serial number of the migration destination storage (S5050).

Thereafter, the external connection switching program 5130 judges whether a normal termination report and physical resource number have been received from the external storage management program 1211 (S5060).

The judgment result is that, when a normal termination report and a physical resource number have not been received (No in S5060), the external connection switching program 5130 transmits an abnormal termination report to the calling source and terminates the processing (S5080). When the judgment result is that a normal termination report and a physical resource number have been received (Yes in S5060), the external connection switching program 5130 transmits a physical resource number and a normal termination report to the calling source and terminates the processing (S5070).

Figure 15:
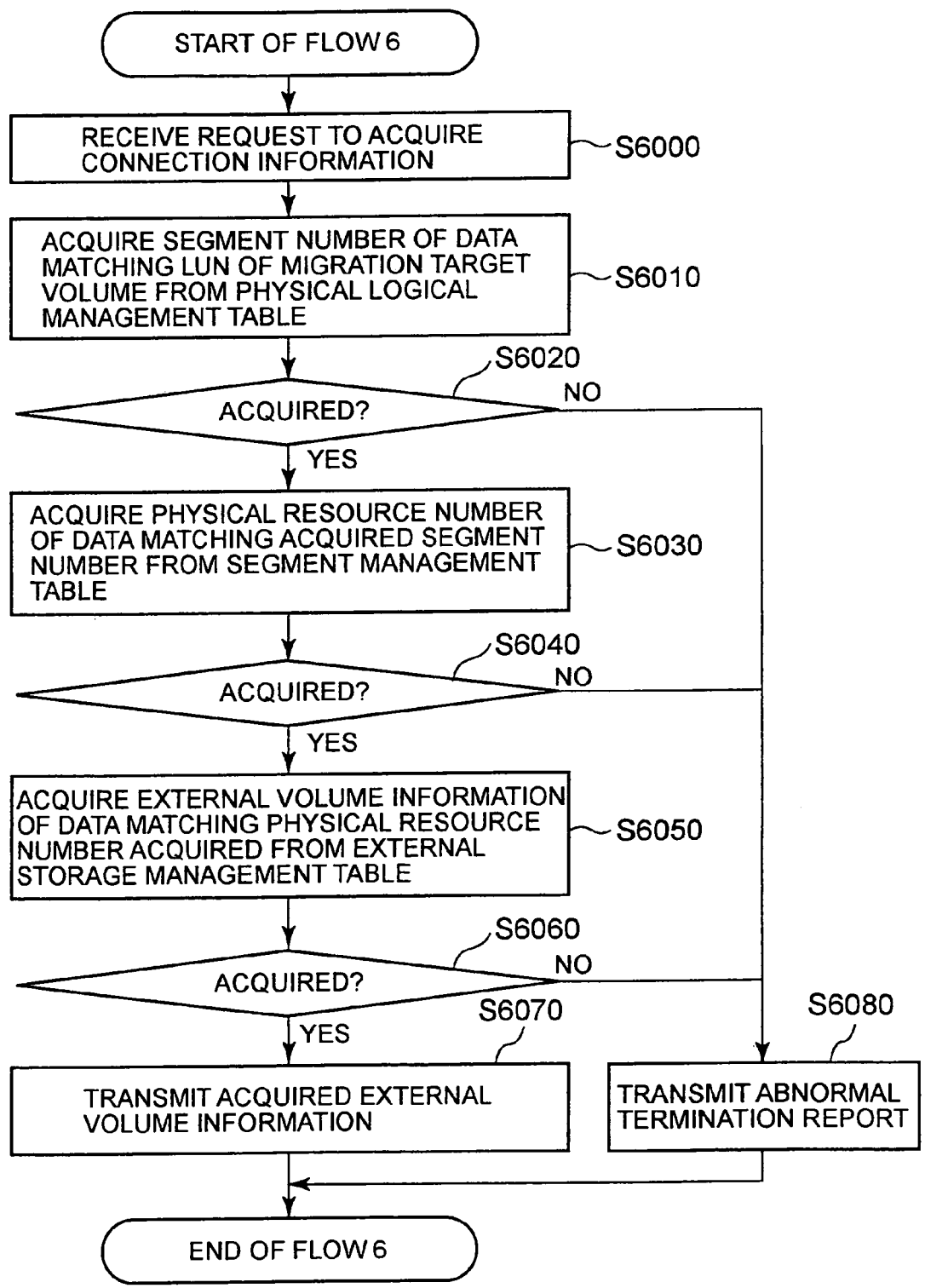
FIG. 15 shows connection-information acquisition processing of the external storage management program of the first embodiment.

The connection information acquisition processing of the external storage management program 1211 will be described next with reference to FIG. 15.

The external storage management program 1211 receives an acquisition request to acquire connection information that contains the LUN of the migration target volume (S6000).

Thereafter, the external storage management program 1211 acquires the LUN T200 of the physical logical management table 1214 and the segment number T210 of data matching the LUN of the migration target volume contained in the request from the physical logical management table 1214 (S6010).

Thereafter, the external storage management program 1211 judges whether the LUN T200 and segment number T210 have been acquired (S6020).

When the judgment result is that the LUN T200 and segment number T210 have not been acquired (No in S6020), the external storage management program 1211 transmits an abnormal termination report to the calling source and terminates the processing (S6080) When the judgment result is that the LUN T200 and segment number T210 have been acquired (Yes in S6020), the external storage mgt program 1211 acquires the segment number T320 of the segment management table 1215 and the physical resource number T310 of data matching the acquired segment number from the segment management table 1215 (S6030).

Thereafter, the external storage management program 1211 judges whether the segment number T320 and the physical resource number T310 have been acquired (S6040).

When the judgment result is that the segment number T320 and the physical resource number T310 have not been acquired (No in S6040), the external storage management program 1211 transmits an abnormal termination report to the calling source and terminates the processing (S6080). When the judgment result is that the segment number T320 and the physical resource number T310 have been acquired (Yes in S6050), the external storage management program 1211 acquires the physical resource number T100 of the external storage management table 1213 and the external volume information T110 matching the acquired physical resource number from the external storage management table 1213 (S6050).

Thereafter, the external storage management program 1211 judges whether the segment number T320 and the physical resource number T310 have been acquired (S6060).

When the judgment result is that the segment number T320 and the physical resource number T310 have not been acquired (No in S6060), the external storage management program 1211 transmits an abnormal termination report to the calling source and terminates the processing (S6080). When the judgment result is that the segment number T320 and the physical resource number T310 have been acquired (Yes in S6060), the external storage management program 1211 transmits the acquired external volume information to the calling source and terminates the processing (S6070).

Figure 16:
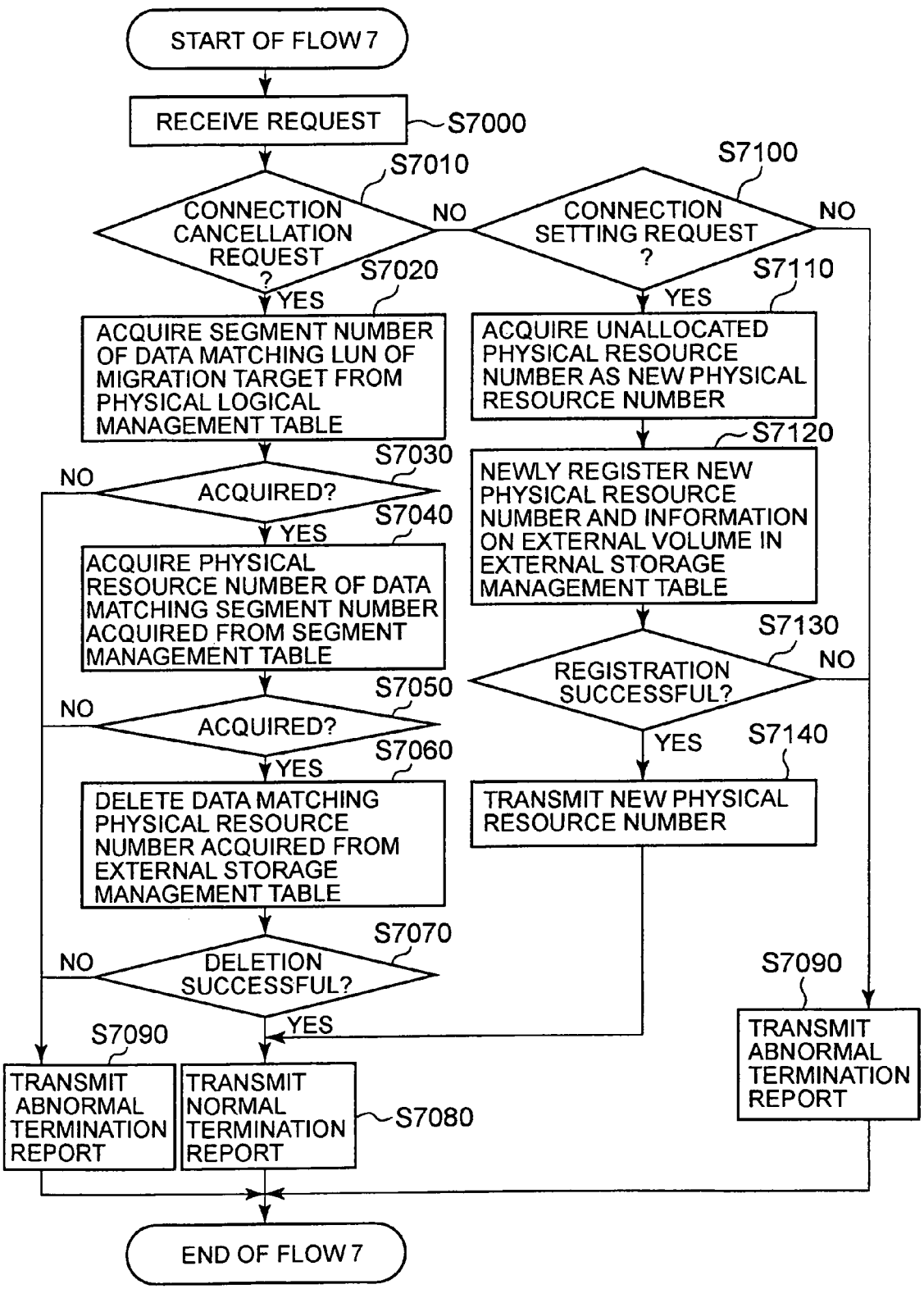
FIG. 16 shows connection cancellation processing and connection setting processing of the external storage management program of the first embodiment.

The connection cancellation processing and connection setting processing of the external storage management program 1211 will be described with reference to FIG. 16.

The external storage management program 1211 receives either a connection cancellation request that contains the LUN of the migration target volume or a connection setting request that contains connection information on a connection to the external storage system (S7000).

Thereafter, the external storage management program 1211 judges whether the received request is a connection cancellation request (S7010).

When the judgment result is that the received request is a connection cancellation request (Yes in S7010), the external storage management program 1211 acquires the LUN T200 of the physical logical management table 1214 and the segment number T210 of data matching the LUN of the migration target volume contained in the request (S7020) from the physical logical management table 1214.

Thereafter, the external storage management program 1211 judges whether the LUN T200 and the segment number T210 have been acquired (S7030).

When the judgment result is that the LUN T200 and the segment number T210 have not been acquired (No in S7030), the external storage management program 1211 transmits the abnormal termination report to the calling source and terminates the processing (S7090). When the judgment result is that the LUN T200 and the segment number T210 have been acquired (Yes in S7030), the external storage management program 1211 acquires the segment number T320 of the segment management table 1215 and the physical resource number T310 of data matching the acquired segment number from the segment management table 1215 (S7040).

Thereafter, the external storage management program 1211 judges whether the LUN T200 and the segment number T210 have been acquired (S7050).

When the judgment result is that the LUN T200 and the segment number T210 have not been acquired (No in S7050), the external storage management program 1211 transmits an abnormal termination report to the calling source and terminates the processing (S7090) When the judgment result is that the LUN T200 and the segment number T210 have been acquired (Yes in S7050), the external storage management program 1211 deletes the physical resource number T100 of the external storage management table 1213 and data matching the acquired physical resource number from the external storage management table 1213 (S7060).

Thereafter, it is judged whether the deletion has been successful (S7070).

When the judgment result is that the deletion has failed (No in S7070), the external storage management program 1211 transmits an abnormal termination report to the calling source (S7090) and terminates the processing (S7090). When the judgment result is that the deletion has been successful (Yes in S7070), the external storage management program 1211 transmits a normal termination report to the calling source (S7080).

When the result of judging whether the received request is a connection cancellation request is that the received request is not a connection cancellation request (No in S7010), the external storage management program 1211 judges whether the received request is a connection setting request (S7100).

When the judgment result is that the received request is not a connection setting request (No in S7100), the external storage management program 1211 transmits an abnormal termination report to the calling source (S7090) and terminates the processing (S7090). When the judgment result is that the received request is a connection setting request (Yes in S7100), the external storage management program 1211 acquires a number that has not been allocated to the physical resource number T310 of the segment management table 1215 as the new physical resource number (S7110). Further, when a logical volume other than the capacity-expansion volume exists and a physical resource is used, an unallocated number containing this information is acquired as the new physical resource number.

Thereafter, the external storage management program 1211 sets the acquired new physical resource number as the physical resource number T100 of the external storage management table 1213 and connection information for a connection with the external storage system contained in the request as the external volume information T110 and registers the acquired new physical resource number and connection information in the external storage management table 1213 (S7120).

The external storage management program 1211 judges whether registration has been successful (S7130).

When the judgment result is that registration has failed (No in S7130), the external storage management program 1211 transmits an abnormal termination report to the calling source (S7090) and terminates the processing. When the judgment result is that the registration has succeeded (Yes in S7130), the external storage management program 1211 transmits the acquired new physical resource number to the calling source (S7140).

Thereafter, the external storage management program 1211 transmits the normal termination report (S7080) and terminates the processing (S7080).

The migration processing of the physical logical information migration program 5140 will be described next with reference to FIG. 17.

The physical logical information migration program 5140 receives a migrate quest that contains the model name and serial number of the migration source storage system, the LUN of the migration target volume, the model name and serial number of the migration destination storage system, the LUN of the migration destination logical volume, and the new physical resource number acquired by the migration destination storage system (S8000).

Thereafter, the physical logical information migration program 5140 transmits a request to acquire the data of the physical logical management table 1214 and segment management table 1215 of the migration target volume containing the LUN of the migration target volume to the physical logical management program 1212 of the storage system 1000 identified by the model name and serial number of the migration source storage contained in the request (S8010).

Thereafter, the physical logical information migration program 5140 judges whether data of the physical logical management table 1214 has been received (S8020).

When the judgment result is that the data has not been received (No in S8020), the physical logical information migration program 5140 transmits an abnormal termination report to the calling source (S8090) and terminates the processing (S8090). When the judgment result is that the data has been received (Yes in S8020), the physical logical information migration program 5140 judges whether the data of the segment management table 1215 has been received (S8030).

When the judgment result is that the data of the segment management table 1215 has not been received (No in S8030), the physical logical information migration program 5140 transmits the abnormal termination report to the calling source. (S8090) and terminates the processing (S8090). When the judgment result is that the data has been received (Yes in S8030), the physical logical information migration program 5140 rewrites the information on the LUN T200 of the data of the received physical logical management table 1214 to the LUN of the migration destination logical volume contained in the request (S8040).

Thereafter, the physical logical information migration program 5140 rewrites the physical resource number T310 of the data of the received segment physical table 1215 to the new physical resource number contained in the request (S8050).

Subsequently, the physical logical information migration program 5140 transmits a data setting request that contains the data of the physical logical management table 1214 and the data of the segment management table 1215 that have been rewritten to the physical logical management program 1212 of the storage system 1000 that is identified by the model name and serial number of the migration destination storage contained in the request (S8060).

Thereafter, the physical logical information migration program 5140 judges whether a normal termination report has been received from the physical logical management program 1212 (S8070).

When the judgment result is that a normal termination report has not been received (No in S8070), the physical logical information migration program 5140 transmits an abnormal termination report to the calling source (S8090) and terminates the processing (S8090). When the judgment result is that a normal termination report has been received (Yes in S8070), the physical logical information migration program 5140 transmits a normal termination report to the calling source and terminates the processing (S8080).

Figure 18:
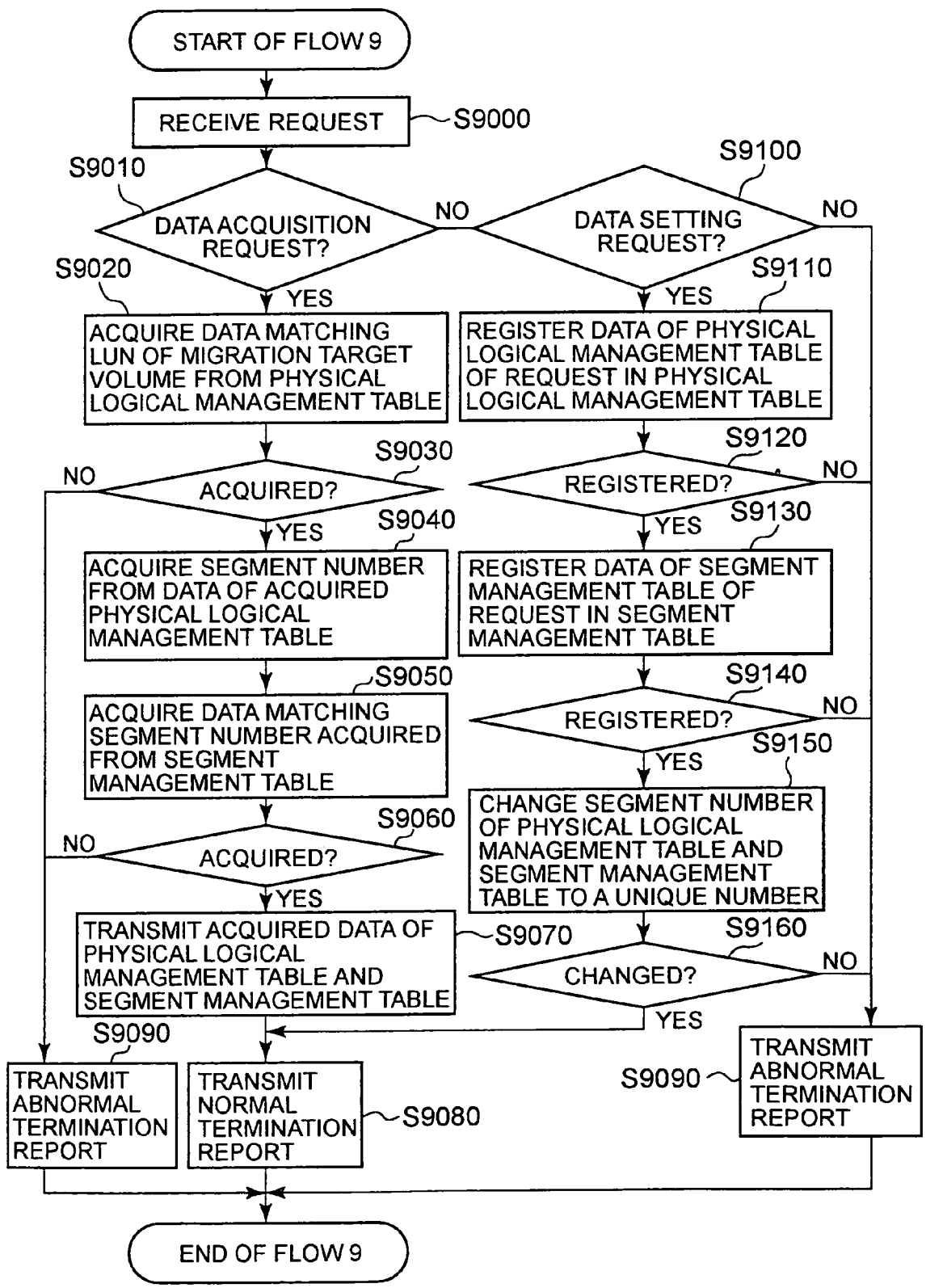
FIG. 18 shows data acquisition processing and data setting processing of the physical logical management program of the first embodiment.

The data acquisition processing and data setting processing of the physical logical management program 1212 will be described next with reference to FIG. 18.

The physical logical management program 1212 receives either a data acquisition request that contains the LUN of the migration target volume or a data setting request that contains the data of the physical logical management table 1214 and the data of the segment management table 1215 (S9000).

Thereafter, the physical logical management program 1212 judges whether the received request is a data acquisition request (S9010).

When the judgment result is that a data acquisition request has been received (Yes in S9010), the physical logical management program 1212 searches for and acquires the LUN T200 of the physical logical management table 1214 and data matching the LUN of the migration target volume contained in the request from the physical logical management table 1214 (S9020).

Thereafter, the physical logical management program 1212 judges whether the LUN T200 and data have been acquired (S9030).

When the judgment result is that the LUN T200 and data have not been acquired (No in S9030), the physical logical management program 1212 transmits an abnormal termination report to the calling source (S9090) and terminates the processing (S9090) When the judgment result is that the LUN T200 and data have been acquired (Yes in S9030), the physical logical management program 1212 acquires the segment number from the data of the acquired physical logical management table 1214 (S9040).

Thereafter, the physical logical management program 1212 searches for and acquires the segment number T320 of the segment management table 1215 and data matching the acquired segment number from the segment management table 1215 (S9050).

Subsequently, the physical logical management program 1212 judges whether the segment number T320 and data have been acquired (S9060).

When the judgment result is that the segment number T320 and data have not been acquired (No in S9060), the physical logical management program 1212 transmits an abnormal termination report to the calling source and terminates the processing (S9090). When the judgment result is that the segment number T320 and data have been acquired (Yes in S9060), the physical logical management program 1212 transmits the acquired physical logical management table and segment management table to the calling source (S9070).

Thereafter, the physical logical management program 1212 transmits a normal termination report to the calling source (S9080) and terminates the processing.

When the result of judging whether the received request is a data acquisition request is that the received request is not a data acquisition request (No in S9010), the physical logical management program 1212 judges whether the received request is a data setting request (S9100).

When the judgment result is that the received request is not a data setting request (No in S9100), the physical logical management program 1212 transmits an abnormal termination report to the calling source (S9090) and terminates the processing. When the judgment result is that the received request is a data setting request (Yes in S9100), the physical logical management program 1212 registers the data of the physical logical management table contained in the request in the physical logical management table 1214 (S9110).

Subsequently, the physical logical management program 1212 judges whether the data has been registered (S9120).

When the judgment result is that registration has failed (No in S9120), the physical logical management program 1212 transmits a abnormal termination report to the calling source (S9090) and terminates the processing. When the judgment result is that registration has succeeded (Yes in S9120), the physical logical management program 1212 registers the data of the segment management table contained in the request to the segment management table 1215 (S9130).

Subsequently, the physical logical management program 1212 judges whether the data has been registered (S9140).

When the judgment result is that registration has failed (No in S9140), the physical logical management program 1212 transmits an abnormal termination report to the calling source (S9090) and terminates the processing. When the judgment result is that registration has succeeded (Yes in S9140), the physical logical management program 1212 changes the segment number T210 of the data of the physical logical management table thus added and the segment number T320 of the data of the segment management table thus added to a number that has not been allocated to the segment number T320 of the segment management table 1215 (S9150).

Thereafter, the physical logical management program 1212 judges whether the segment numbers T210 and T320 have been changed (S9160).

When the judgment result is that the change has failed (No in S9160), the physical logical management program 1212 transmits an abnormal termination report to the calling source (S9090) and terminates the processing. When the judgment result is that the change has been successful (Yes in S9160), the physical logical management program 1212 transmits a normal termination report to the calling source (S9080) and terminates the processing.

According to the first embodiment above, when an instruction from the administrator or a high load of the storage system is sensed, the management computer is able to migrate the capacity-expansion volume by acquiring management information on the capacity-expansion volume of the migration source storage system 1000A after switching the external storage system 1000C connected to the migration source storage system 1000A to the migration destination storage system 1000B, converting the management information on the capacity-expansion volume to information that is suited to the migration destination storage system 1000B, changing the setting to the migration destination storage system 1000B, and switching the path between the host computer and the storage system. As a result, because there is no need to copy the data between the storage systems 1000A and 1000B, the load of the storage system 1000A can be suppressed, the volume migration time can be shortened irrespective of the size of the data stored in the capacity-expansion volume, and processing to expressly secure a blank area equal to or more than the data size in the migration destination storage system 1000B can be dispensed with.

Second Embodiment

The second embodiment will now be described. Further, the differences from the first embodiment will be mainly described hereinbelow and a description of the common points with the first embodiment will be omitted or simplified (the same is also true of the third embodiment described subsequently).

In the second embodiment, a capacity-expansion volume is migrated by processing that is different from that of the first embodiment. More specifically, in the above first embodiment, in the path switching processing described with reference to FIG. 14, processing is performed to register information related to the external storage system in the external storage management table 1213 of the migration destination storage system 1000 after deleting information related to the external storage system that stores data of the migration target volume from the external storage management table 1213 of the migration source storage system 1000. However, in the second embodiment, effects similar to those of the path switching processing of the external storage system are obtained by setting and controlling a value indicating whether a resource is a management target resource of the storage system itself in the segment management table.

(1) The System Constitution of the Second Embodiment

FIG. 19 shows the constitutional view of the segment management table 1215 of the second embodiment.

A management condition T360 is recorded in addition to the information recorded in the table 1215 of the first embodiment in the segment management table 1215. The management condition T360 holds information representing whether the segment is a manageable resource of the storage system 1000. Management conditions include 'being managed', which represents the fact that the segment is a manageable resource and 'unmanageable', which represents the fact that the segment is an unmanageable resource. Further, although the usage condition is represented as a character string in FIG. 19 for the sake of expediency, a numeral permitting identification of the usage condition may be stored in place of the character string. Further, the value 'being managed' is set as the initial value in the management condition T360 in the following description for the sake of expediency.

(2) Operation of the Second Embodiment

Figure 20:
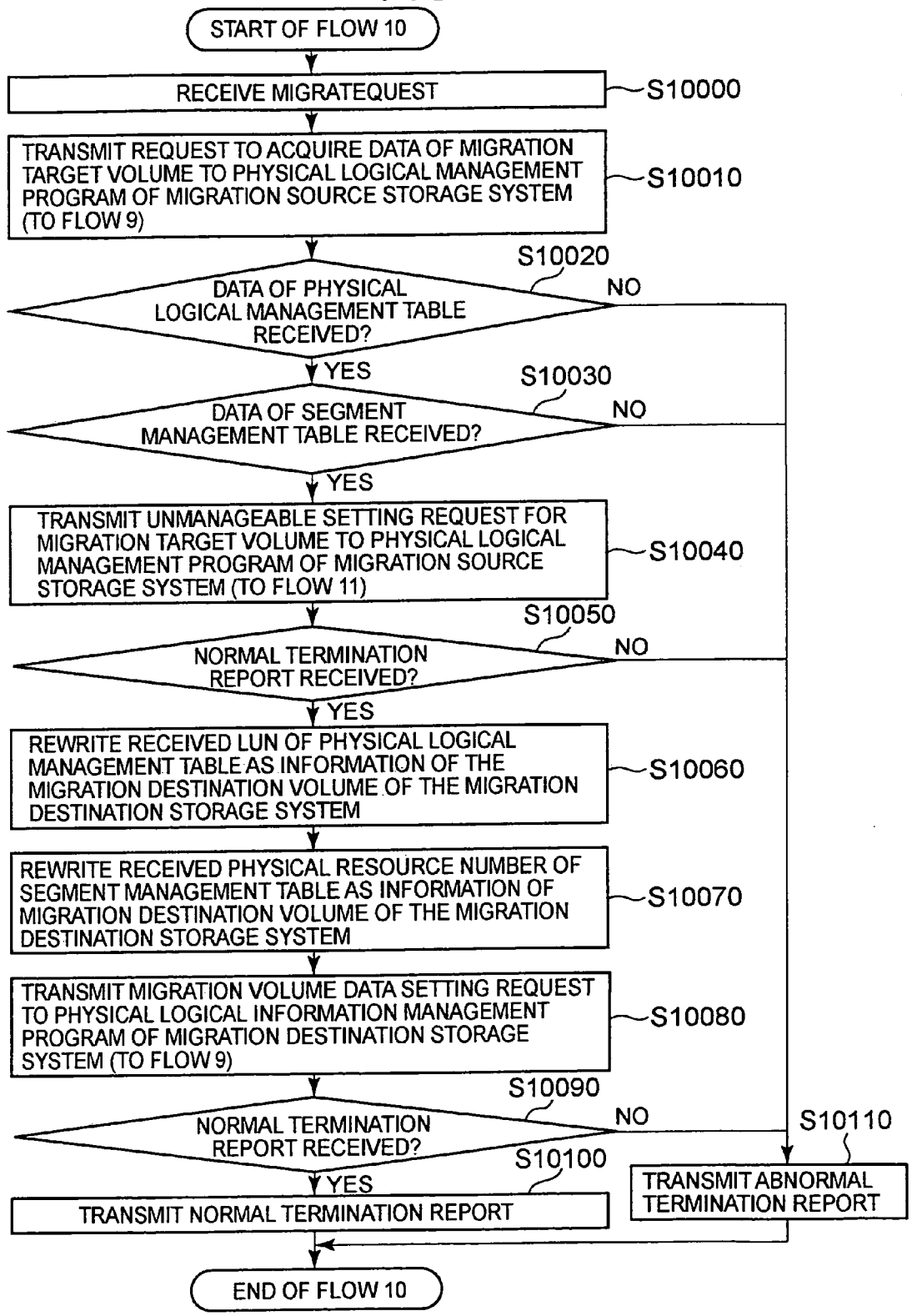
FIG. 20 shows the migration processing of the physical logical information migration program of the second embodiment.

The migration processing of the physical logical information migration program 5140 of the second embodiment will be described with reference to FIG. 20.

Figure 17:
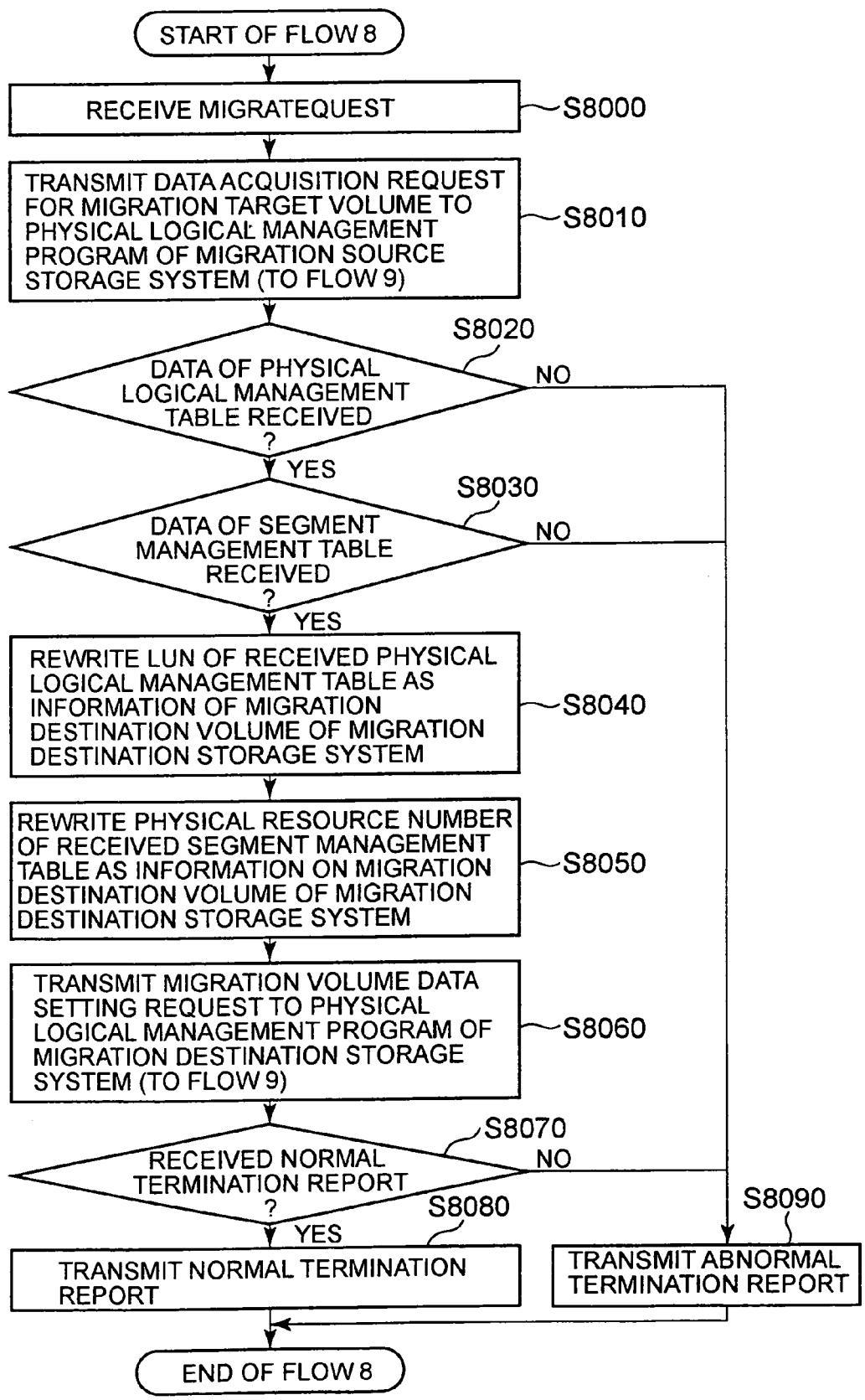
FIG. 17 shows the migration processing of a physical logical information migration program of the first embodiment.

The physical logical information migration program 5140 performs the same processing as S8000 to S8030 in FIG. 17 (S10000 to S10030).

When the result of the judgment of S10030 is that the data has been received (Yes in S10030), the physical logical information migration program 5140 transmits an unmanageable setting request that contains the LUN of the migration target volume to the physical logical management program 1212 of the migration destination storage system 1000 (S10040).

Thereafter, the physical logical information migration program 5140 judges whether a normal termination report has been received from the physical logical management program 1212 (S10050).

When the judgment result is that a normal termination report has not been received (No in S10050), the physical logical information migration program 5140 transmits an abnormal termination report to the calling source (S10110) and terminates the processing When the judgment result is that a normal termination report has been received, the physical logical information migration program 5140 performs the same processing as S8040 to S8090 in FIG. 17 (S10060 to S10110).

Figure 21:
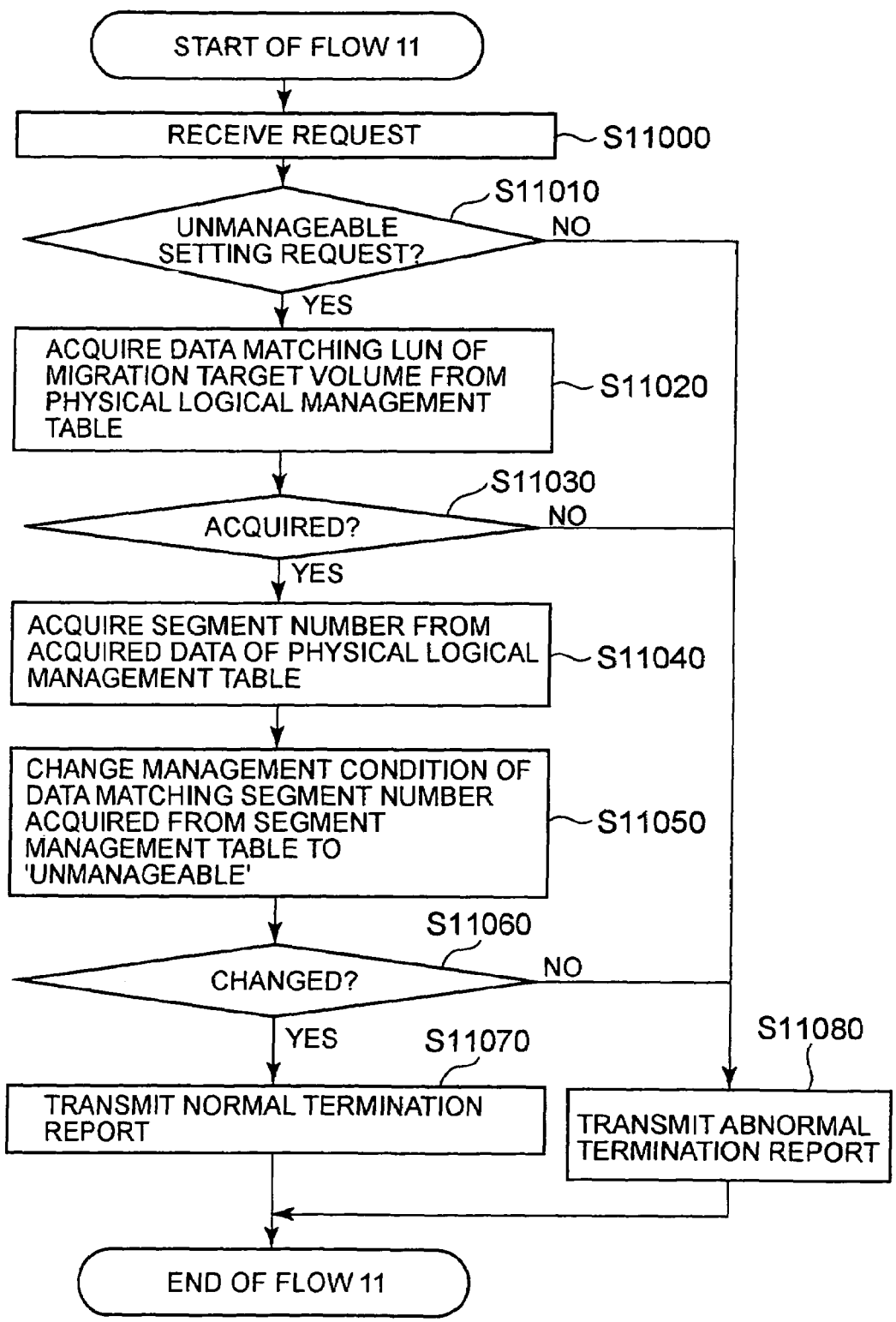
FIG. 21 shows the unmanageable setting processing of the physical logical management program of the second embodiment.

The unmanageable setting processing of the physical logical management program 1212 of the second embodiment will be described next with reference to FIG. 21.

The physical logical management program 1212 receives an unmanageable setting request that contains the LUN of the migration target volume (S11000).

The physical logical management program 1212 judges whether the received request is an unmanageable setting request next (S11010).

When the judgment result is that the received request is not an unmanageable setting request (No in S11010), the physical logical management program 1212 transmits an abnormal termination report to the calling source (S11080) and terminates the processing. When the judgment result is that the received request is an unmanageable setting request (Yes in S11010), the physical logical management program 1212 searches for and acquires the LUN T200 of the physical logical management table 1214 and data that matches the LUN of the migration target volume contained in the request from the physical logical management table 1214 (S11020).

Thereafter, the physical logical management program 1212 judges whether the LUN T200 and data have been acquired (S11030).

When the judgment result is that the LUN T200 and data have not been acquired (No in S11030), the physical logical management program 1212 transmits an abnormal termination report to the calling source (S11080) and terminates the processing. When the judgment result is that the LUN T200 and data have been acquired (Yes in S11030), the physical logical management program 1212 acquires the segment number from the acquired physical logical management table 1214 (S11040).

Thereafter, the physical logical management program 1212 searches for the segment number T320 of the segment management table 1215 and data matching the acquired segment number, and sets 'unmanageable', which indicates that the resource is a resource other than the management target of the storage system as the management condition T360 of the corresponding data (S11050). Further, although the usage condition is represented as a character string in FIG. 21 for the sake of expediency, a numeral or the like that permits identification of the usage condition may be stored in place of the character string.

Thereafter, the physical logical management program 1212 judges whether the change has been made (S11060).

When the judgment result is that the change has not been made (No in S11060), the physical logical management program 1212 transmits an abnormal termination report to the calling source (S11080) and terminates the processing. When the judgment result is that the change has been successful (Yes in S11060), the physical logical management program 1212 transmits a normal termination report to the calling source (S11070) and terminates the processing.

According to the second embodiment, unlike the first embodiment, the same external volume is associated beforehand with both the physical resource of the migration source storage system ('migration source physical resource' hereinbelow) and the physical resource of the migration destination storage system ('migration destination physical resource' hereinbelow). Prior to the migration, the respective management conditions of all the segments of the migration source physical resource and all the segments of the migration destination physical resource are 'being managed'. However, following the migration, the management conditions of all the segments allocated to the capacity-expansion volume of the migration target become 'unmanageable'. That is, in processing that differs from that of the first embodiment, the path to the external volume can be switched from the migration source storage system 1000A to the migration destination storage system 1000B. Further, in the second embodiment, the respective segments of the migration destination physical resource may have the management condition 'unmanageable' prior to the migration and may be switched from 'unmanageable' to 'being managed' following the migration. Further, in the second embodiment, the physical resource of the migration destination storage system 1000B that is associated with the LUN of the migration destination is a physical resource that is connected to an external volume connected to the physical resource having segments labeled as 'unmanageable' in the migration source storage system 1000A.

Third Embodiment

Figure 24A:
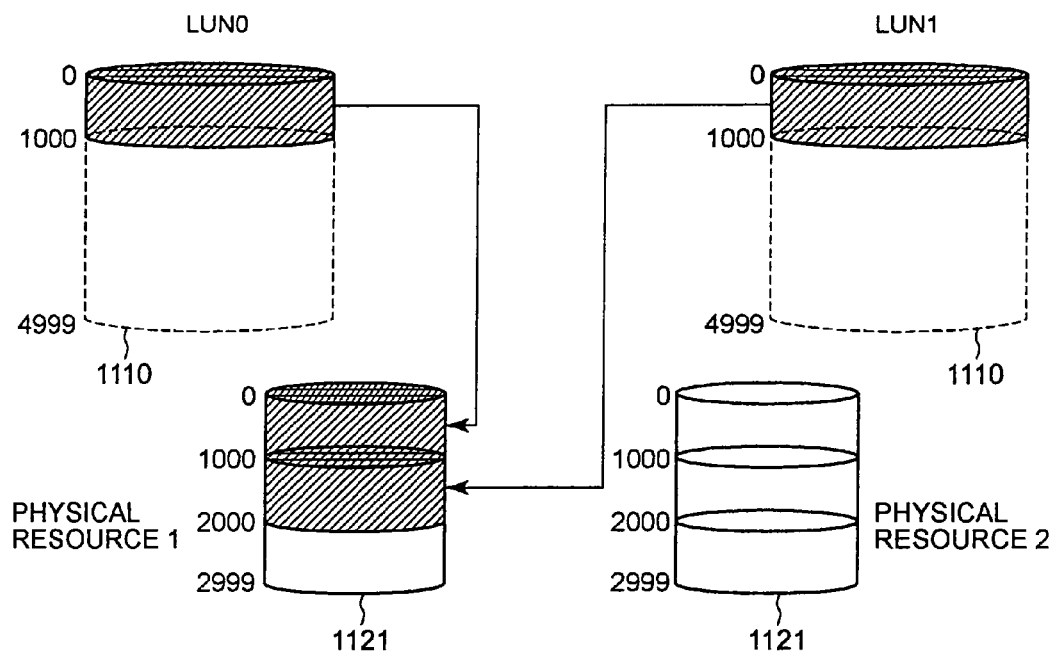
FIG. 24A shows an example of the usage of one physical resource by a plurality of capacity-expansion volumes.

One physical resource can be used as a plurality of capacity-expansion volumes. More specifically, as exemplified by FIG. 24A, for example, when the storage system 1000A has a first capacity-expansion volume (LUN0) and a second capacity-expansion volume (LUN1), a first segment that constitutes the first physical resource (physical resource 1) can be allocated to the first capacity-expansion volume and the second segment that constitutes the same physical resource can be allocated to the second capacity-expansion volume.

Further, in this embodiment, the unit of the migration via the external connection is a physical resource unit rather than a segment unit. That is, a physical resource is associated with an external volume.

Figure 24B:
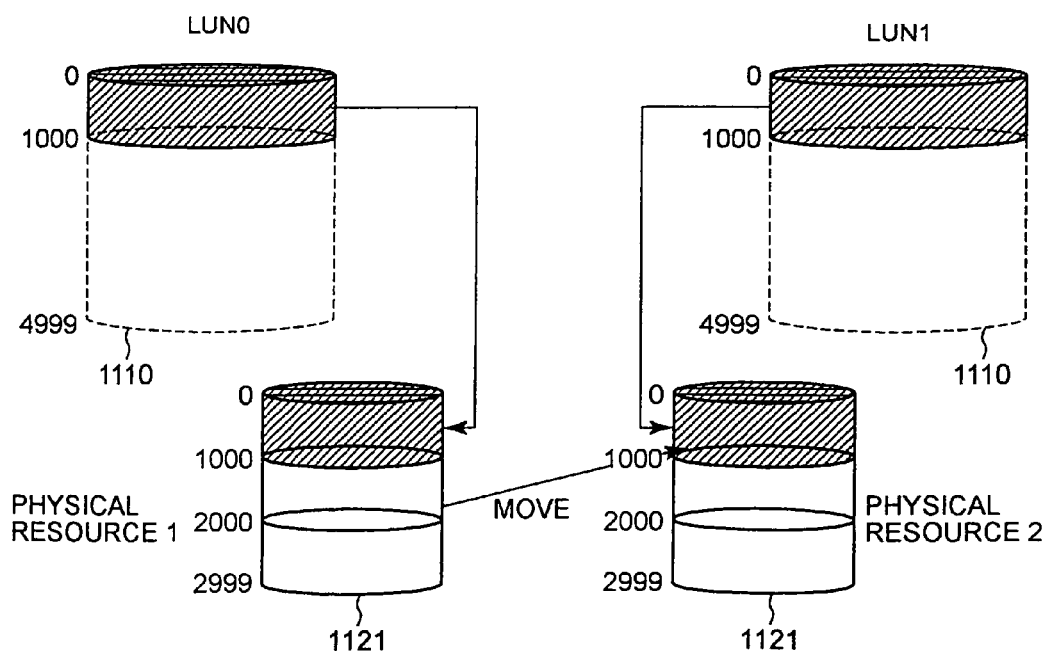
FIG. 24B shows the movement of data in a segment allocated to the capacity-expansion volume to be migrated in FIG. 24A to a segment of the other physical resources.

Therefore, in this embodiment, as exemplified by FIG. 24B, when the migration target is the first capacity-expansion volume, the data in the segment allocated to the second capacity-expansion volume is moved (or copied) to an empty segment of the second physical resource (physical resource 2) and the segment allocated to the first physical resource is the only segment allocated to the first capacity-expansion volume. Thus, the first capacity-expansion volume is migrated. As a result, even when one physical resource is used for a plurality of capacity-expansion volumes, the capacity-expansion volumes can be migrated in physical resource units.

The third embodiment will be described in detail hereinbelow.

(1) System Constitution of the Third Embodiment

The system constitution of the third embodiment is the same as that of the first embodiment.

(2) Operation of the Third Embodiment

The migration processing of the capacity-expansion volume migration program 5120 of the third embodiment will be described with reference to FIG. 22.

Figure 12:
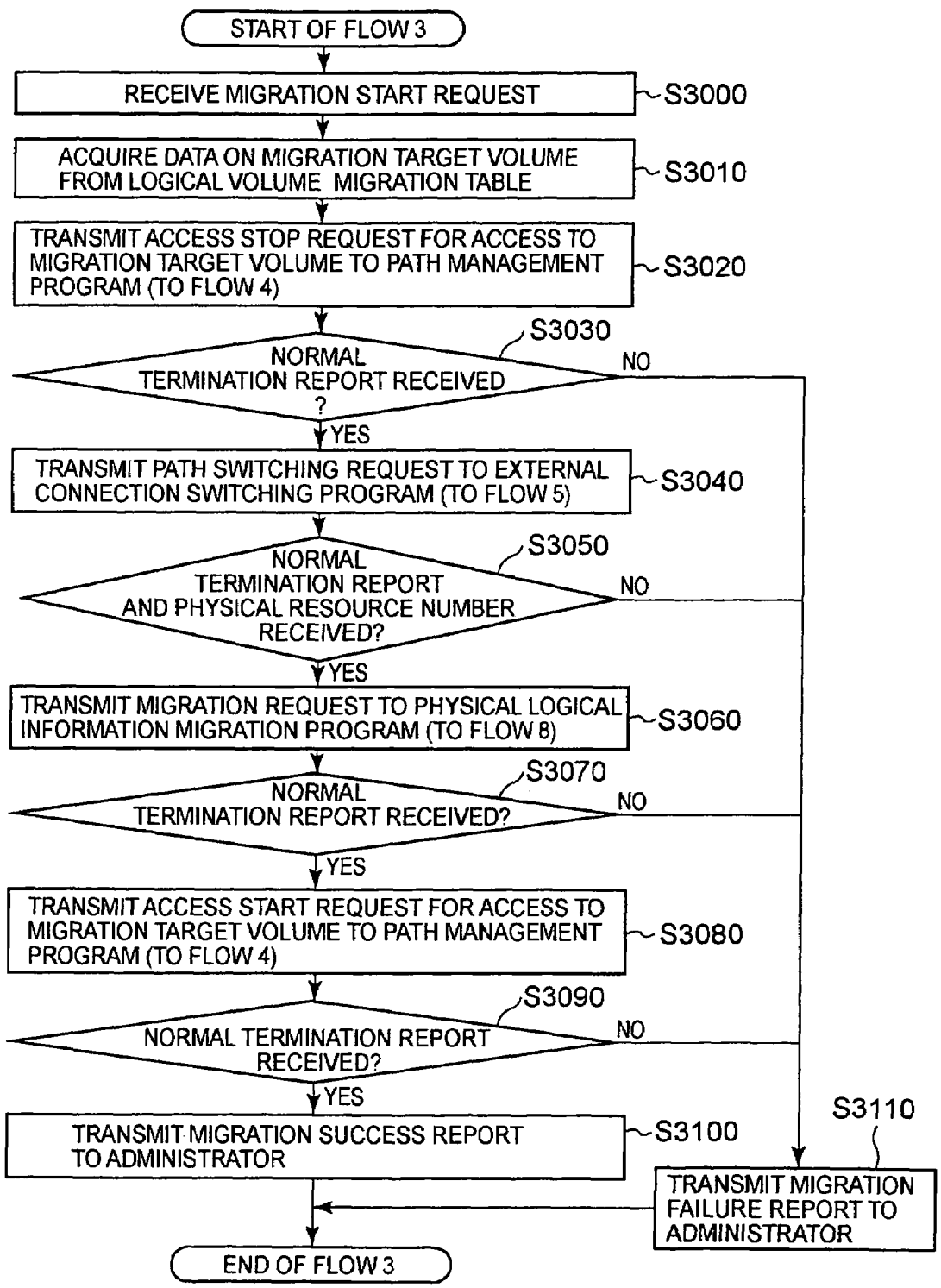
FIG. 12 shows data migration processing of the capacity-expansion volume migration program of the first embodiment.

The capacity-expansion volume migration program 5120 performs the same processing as S3000 to S3030 in FIG. 12 (S12000 to S12030).

When the result of the judgment of S12030 is that a normal termination report has been received (Yes in S12030), the capacity-expansion volume migration program 5120 transmits a sharing cancellation request that contains the LUN of the migration target volume to the physical logical management program 1212 of the storage system 1000 identified by the model name and serial number of the migration source storage system contained in the access stop request (S12040).

Thereafter, the capacity-expansion volume migration program 5120 judges whether a normal termination report has been received from the physical logical management program 1212 (S12050).

When the judgment result is that a normal termination report has not been received (No in S12050), the capacity-expansion volume migration program 5120 transmits the migration failure report to the administrator (S12130) and terminates the processing. When the judgment result is that a normal termination report has been received (Yes in S12050), the capacity-expansion volume migration program 5120 performs the same processing as that of S3040 to S3110 in FIG. 12 (S12060 to S12130).

The sharing cancellation processing of the physical logical management program 1212 of the third embodiment will be described next with reference to FIG. 23.

The management logical management program 1212 receives a sharing cancellation request that contains the LUN of the migration target volume (S13000).

Thereafter, the physical logical management program 1212 searches for and acquires the LUN T200 of the physical logical management table 1214 and data matching the LUN of the migration target volume contained in the request from the physical logical management table 1214 (S13010).

Thereafter, the physical logical management program 1212 judges whether the LUN T200 and data have been acquired (S13020) When the judgment result is that the LUN T200 and data have not been acquired (No in S13020), the physical logical management program 1212 transmits an abnormal termination report to the calling source (S13120) and terminates the processing. When the judgment result is that the LUN T200 and data have been acquired (Yes in S13020), the physical logical management program 1212 acquires the segment number from the data of the acquired physical logical management table 1214 (S13030).

Thereafter, the physical logical management program 1212 searches for and acquires the segment number T320 of the segment management table 1215 and the physical resource number T310 of the data matching the acquired segment number from the segment management table 1215 (S13040).

Following the acquisition, the physical logical management program 1212 searches to determine whether a segment that is used by a volume other than the migration target volume exists in the segment allocated to the acquired physical resource number T310 from the segment management table 1215 (S13050).

Thereafter, it is judged whether a segment that is used by a volume other than the migration target volume has been found (S13060).

When the judgment result is that a segment has not been found (No in S13060), the physical logical management program 1212 judges that the physical resources other than the migration target volume have not been used and transmits a normal termination report to the calling source (S13110) and terminates the processing. When the judgment result is that a segment has been found (Yes in S13060), the physical logical management program 1212 copies data of a segment used by a volume other than the migration target volume to a blank segment of a physical resource with a number other than the acquired physical resource number (S13070). Further, although omitted for the sake of expediency from FIG. 23, processing to delete the data of the copy source segment after copying may be performed Subsequently, the physical logical management program 1212 judges whether copying has been successful (S13080).

When the judgment result is that the copying has not succeeded (No in S13080), the physical logical management program 1212 transmits an abnormal termination report to the calling source (S13120) and terminates the processing. When the judgment result is that the copying has been successful (Yes in S13080), the physical logical management program 1212 changes the segment number T210 prior to the shift of the physical logical management table 1214 to the post-shift segment number (S13090).

The physical logical management program 1212 then judges whether the change has been made (S13100).

When the judgment result is that the change has not been made (No in S13100), the physical logical management program 1212 transmits the abnormal termination report to the calling source (S13120) and terminates the processing. When the judgment result is that the change has been made (Yes in S13100), the physical logical management program 1212 transmits a normal termination report to the calling source (S13110) and terminates the processing.

According to the third embodiment hereinabove, even when one physical resource is used by a plurality of capacity-expansion volumes, the capacity-expansion volumes can be moved in physical resource units.

Embodiments of the present invention were described hereinabove but these embodiments were examples for describing the present invention and there is no intention to limit the scope of the present invention to these embodiments alone. The present invention can also be implemented by means of a variety of other embodiments without deviating from the spirit of the invention. For example, when a switch device exists as a constituent element of a data network, the switch device may comprise an external connection function, such as an external storage management program 1211 and an external storage management table 1213, for example. The host computer 2000 may also comprise the external connection function.

What is claimed is:

1. A computer system, comprising:
a host computer;
a plurality of storage systems including first and second storage systems;
an external storage system constituting an external storage system for the plurality of storage systems; and
a management computer, wherein
the first and second storage systems include:
a pool constituted by a plurality of storage areas; and
a controller that executes capacity-expansion processing that allocates a storage area in the pool to a capacity-expansion volume and cancels the allocation, and wherein
an external connection path, which is a communication channel linking one or more storage areas in the pool that at least the first storage system includes and an external storage device which is a storage device that the external storage system includes, is provided between the one or more storage areas and the external storage device;
a host connection path, which is a communication channel that links the host computer and a capacity-expansion volume of the first storage system, is provided between the host computer and the capacity-expansion volume;
when an access request is issued from the host computer via the host connection path and access is made to a storage area that is allocated to the capacity-expansion volume in accordance with the access request, access is made via the external connection path to an external storage device connected to the storage area, and wherein
the management computer includes:
a capacity expansion volume migration section that migrates a capacity-expansion volume that the first storage system includes, to the second storage system;
a host connection path switching section that switches the host connection path being used from a first host connection path that links a migration source capacity-expansion volume and the host computer to a second host connection path that links a migration destination capacity-expansion volume and the host computer; and
an external connection path switching section that switches the external connection path being used from a first external connection path that links a storage area allocated to the migration source capacity-expansion volume and the external storage device to a second external connection path that links a storage area that is allocated to the migration destination capacity-expansion volume and the external storage device;
wherein,
when the first storage system includes a plurality of capacity-expansion volumes including the migration source capacity-expansion volume, and a plurality of physical storage resources and, as a result, a shared state in which the respective storage areas allocated to the plurality of capacity-expansion volumes are the constituent elements of the same physical storage resource is produced,
the capacity-expansion volume migration section transmits a sharing cancellation request which is a request to cancel the shared state to the controller of the first storage system and, as a result, the data in a segment allocated to the capacity-expansion volumes other than the migration source capacity-expansion volume among the data in the same physical storage resource are written to a segment of another physical storage resource among the plurality of physical storage resources, and a predetermined response is sent back to the capacity expansion volume migration section; and
the capacity-expansion volume migration section migrates the capacity-expansion volume of the first storage system when the predetermined response is received.

2. The computer system according to claim 1, wherein
the controller of the first storage system stores capacity expansion management information that is information for managing which storage area is allocated to which capacity-expansion volume; and
the management computer includes a management information setting section that acquires the capacity expansion management information from the controller of the first storage system, and sets the acquired capacity expansion management information for the controller of the second storage system.

3. The computer system according to claim 2, wherein the management information setting section converts the acquired capacity expansion management information on a basis of a storage area allocated to the migration destination capacity-expansion volume, and sets the converted capacity expansion management information for the controller of the second storage system.

4. The computer system according to claim 1, wherein the external connection path switching section transmits a path cancellation request which is a request to cancel the first external connection path to the controller of the first storage system and, as a result, the first external connection path is cancelled; and the external connection path switching section transmits a path setting request that contains information relating to the external storage device to the controller of the second storage system and, as a result, the second external connection path, which links the external storage device and a storage area allocated to the migration destination capacity-expansion volume that is a storage area that has not been allocated in the second storage system, is provided.

5. The computer system according to claim 4, wherein the controller of the first storage system stores capacity expansion management information constituting information for managing which storage area is allocated to which capacity-expansion volume, and the management computer comprises:

a management information setting section that acquires the capacity expansion management information from the controller of the first storage system, converts the acquired capacity expansion management information to capacity expansion management information that represents the fact that the unallocated storage area has been allocated to the acquired migration destination capacity-expansion volume, and sets the converted capacity expansion management information for the controller of the second storage system.

6. The computer system according to claim 1, wherein both the first external connection path and the second external connection path are connected beforehand to the external storage device;

the controller of the first storage system and the controller of the second storage system both manage the status of the storage area in the storage system including each of the controllers and, when the status is shown as unmanageable, do not manage storage areas corresponding with the status; and the external connection path switching section transmits an unmanageable setting request which is a request to render the migration source capacity-expansion volume unmanageable to the controller of the first storage system and, as a result, the status of the storage area allocated to the migration source capacity-expansion volume is updated to unmanageable.

7. The computer system according to claim 1, wherein the pool is constituted by a plurality of physical storage resources and each management storage resource is constituted by one or more storage areas; and allocation to the capacity-expansion volume is by units of storage area and connection to the external storage device is by units of physical storage resources.

8. The computer system according to claim 1, comprising:

a storage section for storing processing management information constituting information representing types of processing that can be executed by the plurality of storage systems; and a migration destination candidate selection section that selects a storage system capable of executing at least the capacity-expansion processing as a migration destination candidate from among the plurality of storage systems by using the processing management information.

9. The computer system according to claim 8, wherein the controller of the first storage system comprises a storage section that stores external connection management information constituting information representing which storage area of the controller is connected to which external storage device and, when access is made to a storage area, external connection processing that accesses an external storage device that is connected to the storage area by specifying the external storage device on the basis of the external connection management information is executed; and the migration destination candidate selection section selects a storage system capable of executing the external connection processing as the migration destination candidate in addition to the capacity-expansion processing.

10. The computer system according to claim 1, wherein the capacity expansion volume migration section executes the migration of the capacity-expansion volume upon sensing an instruction from an administrator or a high load of the first storage system.

11. The computer system according to claim 1, wherein the capacity expansion volume migration section executes the migration of the capacity-expansion volume after transmitting an access stop request constituting a request not to issue an access request to the migration source capacity-expansion volume to the host computer and, when the migration is complete, transmits an access permission request which is a request that indicates that an access request may be issued to the transmission destination capacity-expansion volume to the host computer.

12. A capacity-expansion volume migration method that is implemented by a computer system including a host computer, a plurality of storage systems including first and second storage systems, and an external storage system that is an external storage system for the plurality of storage systems, wherein the first and second storage systems include:

a pool that is constituted by a plurality of storage areas; and a controller that executes capacity-expansion processing that allocates a storage area in the pool to a capacity-expansion volume and cancels the allocation, and wherein an external connection path, which is a communication channel linking one or more storage areas in the pool that at least the first storage system includes and an external storage device which is a storage device that the external storage system includes, is provided between the one or more storage areas and the external storage device;

a host connection path, which is a communication channel that links the host computer and a capacity-expansion volume of the first storage system, is provided between the host computer and the capacity-expansion volume;

when an access request is issued from the host computer via the host connection path and access is made to a storage area that is allocated to the capacity-expansion volume in accordance with the access request, access is made via the external connection path to an external storage device connected to the storage area, the capacity-expansion volume migration method comprising:

migrating a capacity-expansion volume that the first storage system includes, to the second storage system;

switching the host connection path being used from a first host connection path that links a migration source capacity-expansion volume and the host computer to a second host connection path that links a migration destination capacity-expansion volume and the host computer; and switching the external connection path being used from a first external connection path that links a storage area allocated to the migration source capacity-expansion volume and the external storage device to a second external connection path that links a storage area that is allocated to the migration destination capacity-expansion volume and the external storage devices;

including, in the first storage system, a plurality of capacity-expansion volumes including the migration source capacity-expansion volume, and a plurality of physical storage resources and, as a result, producing a shared state in which the respective storage areas allocated to the plurality of capacity-expansion volumes are the constituent elements of the same physical storage resource, transmitting a sharing cancellation request which is a request to cancel the shared state to the controller of the first storage system and, as a result, writing the data in a segment allocated to the capacity-expansion volumes other than the migration source capacity-expansion volume among the data in the same physical storage resource, to a segment of another physical storage resource among the plurality of physical storage resources, and sending back a predetermined response to the capacity expansion volume migration section; and migratinq the capacity-expansion volume of the first storage system when the predetermined response is received.

13. The migration method according to claim 12, wherein the controller of the first storage system stores capacity expansion management information which is information for managing which storage area is allocated to which capacity-expansion volume, the migration method comprising:

acquiring the capacity expansion management information from the controller of the first storage system; and setting the acquired capacity expansion management information for the controller of the second storage system.

14. The migration method according to claim 13 comprising:

converting the acquired capacity expansion management information on the basis of the storage area allocated to the migration destination capacity-expansion volume; and setting the converted capacity expansion management information for the controller of the second storage system.

15. The migration method according to claim 12, comprising:

canceling the first external connection path;

newly providing the second external connection path that links a storage area allocated to the migration destination capacity-expansion volume that constitutes an unallocated storage area in the second storage system to the external storage device; and, as a result, switching the external connection path.

16. The migration method according to claim 12, wherein both the first external connection path and the second external connection path are connected beforehand to the external storage device; and the controller of the first storage system and the controller of the second storage system both manage the status of the storage area in the storage system including each of the controllers and, when the status is shown as unmanageable, do not manage storage areas corresponding with the status, the migration method comprising:

switching the external connection path by updating the status of the storage area allocated to the migration source capacity-expansion volume in the controller of the first storage system, to unmanageable.

17. The migration method according to claim 12, wherein the pool is constituted by a plurality of physical storage resources, and each physical storage resource is constituted by one or more storage areas;

allocation to the capacity-expansion volume is by units of storage areas, and connection to the external storage device is by units of physical storage resources; and when the first storage system includes a plurality of capacity-expansion volumes including the migration source capacity-expansion volume, and a plurality of physical storage resources and, as a result, a shared state in which the respective storage areas allocated to the plurality of capacity-expansion volumes are the constituent elements of the same physical storage resource is produced, the migration method comprises:

writing the data in a segment allocated to the capacity-expansion volumes other than the migration source capacity-expansion volume among data in the same physical storage resource to a segment of another physical storage resource among the plurality of physical storage resources and, subsequently, migrating the capacity-expansion volume of the first storage system.

18. A management computer, wherein a host computer is connected to at least a first storage system among a plurality of storage systems that include first and second storage systems;

the first and second storage systems are connected to an external storage system which is an external storage system for the plurality of storage systems and include a pool constituted by a plurality of storage areas and a controller that executes capacity-expansion processing that allocates a storage area in the pool to a capacity-expansion volume and cancels the allocation;

an external connection path, which is a communication channel linking one or more storage areas in the pool that at least the first storage system includes, and an external storage device which is a storage device that the external storage system includes, is provided between the one or more storage areas and the external storage device;

a host connection path, which is a communication channel that links the host computer and a capacity-expansion volume of the first storage system, is provided between the host computer and the capacity-expansion volume;

when an access request is issued from the host computer via the host connection path and access is made to a storage area that is allocated to the capacity-expansion volume in accordance with the access request, access is made via the external connection path to an external storage device connected to the storage area, the management computer being a management computer that is connected to the host computer and the plurality of storage systems, comprising:

a capacity expansion volume migration section that migrates a capacity-expansion volume that the first storage system includes, to the second storage system;

a host connection path switching section that switches the host connection path being used from a first host connection path that links a migration source capacity-expansion volume and the host computer, to a second host connection path that links a migration destination capacity-expansion volume and the host computer; and an external connection path switching section that switches the external connection path being used from a first external connection path that links a storage area allocated to the migration source capacity-expansion volume and the external storage device, to a second external connection path that links a storage area that is allocated to the migration destination capacity-expansion volume and the external storage device;

wherein, when the first storage system includes a plurality of capacity-expansion volumes including the migration source capacity-expansion volume, and a plurality of physical storage resources and, as a result, a shared state in which the respective storage areas allocated to the plurality of capacity-expansion volumes are the constituent elements of the same physical storage resource, is produced, the capacity-expansion volume migration section transmits a sharing cancellation request which is a request to cancel the shared state to the controller of the first storage system and, as a result, the data in a segment allocated to the capacity-expansion volumes other than the migration source capacity-expansion volume among the data in the same physical storage resource are written to a segment of another physical storage resource among the plurality of physical storage resources, and a predetermined response is sent back to the capacity expansion volume migration sections; and the capacity-expansion volume migration section migrates the capacity-expansion volume of the first storage system when the predetermined response is received.

19. A capacity-expansion volume migration method that is implemented by a computer system including a host computer, a plurality of storage systems including first and second storage systems, and an external storage system that is an external storage system for the plurality of storage systems, wherein the first and second storage systems include:

a pool that is constituted by a plurality of physical storage resources; and a controller that executes capacity-expansion processing that allocates a storage area constituting a physical storage resource to a capacity-expansion volume and cancels the allocation, and wherein an external connection path, which is a communication channel linking a physical storage resource in the pool that at least the first storage system includes, and an external storage device which is a storage device that the external storage system includes, is provided between the physical storage resource and the external storage device;

a host connection path, which is a communication channel that links the host computer and a capacity-expansion volume of the first storage system, is provided between the host computer and the capacity-expansion volume;

when an access request is issued from the host computer via the host connection path and access is made to a storage area that is allocated to the capacity-expansion volume in accordance with the access request, access is made via the external connection path to an external storage device connected to the storage area; and wherein the controller of the first storage system stores capacity expansion management information which is information for managing which storage area is allocated to which capacity-expansion volume, suppresses the host computer so that the host computer does not issue an access request to the migration source capacity-expansion volume, migrates a migration source capacity-expansion volume that the first storage system includes to the second storage system;

switches the host connection path being used from a first host connection path that links a migration source capacity-expansion volume and the host computer, to a second host connection path that links a migration destination capacity-expansion volume and the host computer;

switches the external connection path being used from a first external connection path that links a storage area allocated to the migration source capacity-expansion volume and the external storage device, to a second external connection path that links a storage area that is allocated to the migration destination capacity-expansion volume and the external storage device;

acquires the capacity expansion management information from the controller of the first storage system;

converts the acquired capacity expansion management information on the basis of the storage area allocated to the migration destination capacity-expansion volume;

sets the converted capacity expansion management information for the controller of the second storage system; and allows the suppressed host computer to issue an access request to the migration destination capacity-expansion volume;

include, in the first storage system, a plurality of capacity-expansion volumes including the migration source capacity-expansion volume, and a plurality of physical storage resources and, as a result, produce a shared state in which the respective storage areas allocated to the plurality of capacity-expansion volumes are the constituent elements of the same physical storage resource, transmit a sharing cancellation request which is a request to cancel the shared state to the controller of the first storage system and, as a result, write the data in a segment allocated to the capacity-expansion volumes other than the migration source capacity-expansion volume among the data in the same physical storage resource, to a segment of another physical storage resource among the plurality of physical storage resources, and send back a predetermined response to the capacity expansion volume migration section; and migrate the capacity-expansion volume of the first storage system when the predetermined response is received.

* * * * *